(12) United States Patent
Nakayama et al.

(10) Patent No.: US 8,806,314 B2
(45) Date of Patent: Aug. 12, 2014

(54) COMMUNICATION DEVICE, COMMUNICATION SYSTEM

(75) Inventors: Takeshi Nakayama, Hyogo (JP); Masahiro Ishii, Hyogo (JP)

(73) Assignee: Panasonic Corporation, Osaka (JP)

( * ) Notice: Subject to any disclaimer, the term of this patent is extended or adjusted under 35 U.S.C. 154(b) by 210 days.

(21) Appl. No.: 13/582,816

(22) PCT Filed: Mar. 23, 2012

(86) PCT No.: PCT/JP2012/002040
§ 371 (c)(1),
(2), (4) Date: Sep. 5, 2012

(87) PCT Pub. No.: WO2012/176360
PCT Pub. Date: Dec. 27, 2012

(65) Prior Publication Data
US 2013/0065635 A1 Mar. 14, 2013

(30) Foreign Application Priority Data
Jun. 23, 2011 (JP) ................. 2011-139750

(51) Int. Cl.
*G06F 11/00* (2006.01)
*G06F 21/55* (2013.01)
(52) U.S. Cl.
CPC .................. *G06F 21/558* (2013.01)
USPC ....................... 714/799; 714/821
(58) Field of Classification Search
CPC ............... G60F 21/558; H04W 88/02
USPC ............................. 714/799, 821
See application file for complete search history.

(56) References Cited

U.S. PATENT DOCUMENTS

| 6,108,411 | A * | 8/2000 | Otsuka et al. ............ 379/355.02 |
| 6,236,469 | B1 * | 5/2001 | Watanabe et al. ............. 358/468 |
| 6,734,796 | B2 * | 5/2004 | Forster et al. ............... 340/572.3 |
| 6,985,714 | B2 * | 1/2006 | Akiyama et al. .............. 455/402 |
| 7,043,267 | B1 * | 5/2006 | Saotome et al. ............... 455/557 |
| 8,180,392 | B2 * | 5/2012 | Sekiya et al. ............... 455/552.1 |
| 2009/0024890 | A1 | 1/2009 | Cutrignelli et al. |

FOREIGN PATENT DOCUMENTS

| JP | 2005-116897 | 4/2005 |
| JP | 2008-293144 | 12/2008 |
| JP | 2009-526395 | 7/2009 |

OTHER PUBLICATIONS

International Search Report issued Apr. 24, 2012 in International (PCT) Application No. PCT/JP2012/002040.

* cited by examiner

*Primary Examiner* — Esaw Abraham
(74) *Attorney, Agent, or Firm* — Wenderoth, Lind & Ponack, L.L.P.

(57) ABSTRACT

A detection signal transmitting unit 123 of a first component 110 transmits a plurality of detection signals having different frequency spectrums to a second component 210. Upon receiving the detection signals, a detection signal returning unit 233 of the second component 210 returns, as return signals, respective signal waveforms of the received detection signals to the first component 110. A detection signal judging unit 126 of the first component 110 judges authenticity of the received return signals based on the transmitted detection signals. When the judging unit judges that the received return signals are not authentic, a tamper-resistance control unit 127 adds a restriction to the communication performed between the first component 110 and the second component 210.

15 Claims, 31 Drawing Sheets

| Data pattern | Frequency 1 (Actual size) | Frequency 2 (1/2) | Frequency 3 (1/3) | Frequency 4 (1/4) | ... |
|---|---|---|---|---|---|
| A | 0101_0101 | 0011_0011_ 0011_0011 | 0001_1100_ 0111_0001_ 1100_0111 | 0000_1111_ 0000_1111_ 0000_1111_ 0000_1111_ | ... |
| B | 0110_1010 | 0011_1100_ 1100_1100 | 0001_1111_ 1000_1110_ 0011_1000 | 0000_1111_ 1111_0000_ 1111_0000_ 1111_0000 | ... |
| C | 0111_0101 | 0011_1111_ 0011_0011 | 0001_1111_ 1111_0001_ 1100_0111 | 0000_1111_ 1111_1111_ 0000_1111_ 0000_1111 | ... |
| D | 0011_0011 | 0000_1111_ 0000_1111 | 0000_0011_ 1111_0000_ 0011_1111 | 0000_0000_ 1111_1111_ 0000_0000_ 1111_1111 | ... |
| E | 1010_100 | 1100_1100_ 1100_00 | 1110_0011_ 1000_1110_ 0000_0 | 1111_0000_ 1111_0000_ 1111_0000_ 0000 | ... |
| F | 1010_1010 | 1100_1100_ 1100_1100 | 1110_0011_ 1000_1110_ 0011_1000 | 1111_0000_ 1111_0000_ 1111_0000_ 1111_0000_ | ... |
| ... | ... | ... | ... | ... | ... |
| Sinusoidal wave | Sinusoidal wave: $f_0$ | Sinusoidal wave: $f_0/2$ | Sinusoidal wave: $f_0/3$ | Sinusoidal wave: $f_0/4$ | ... |

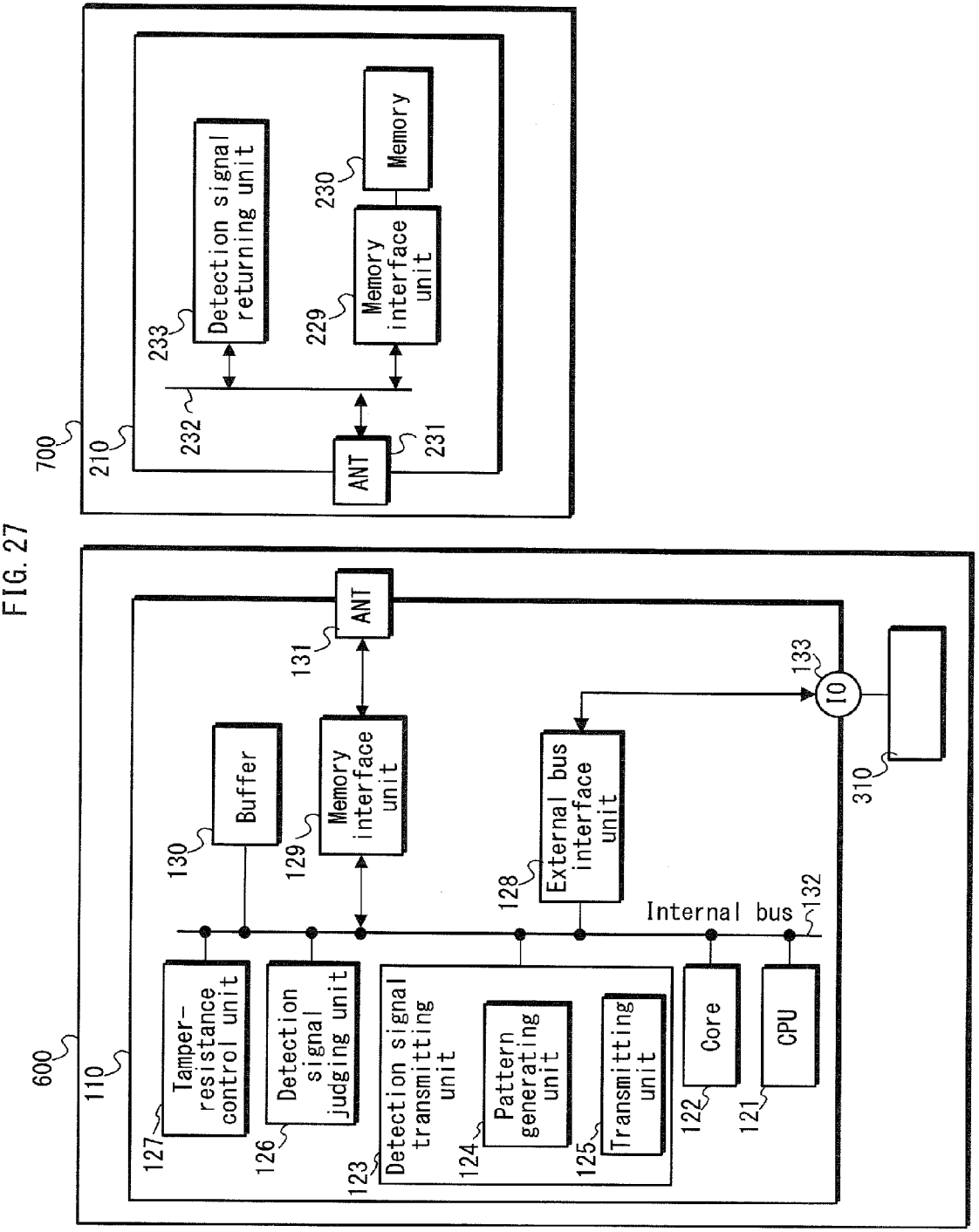

1000

COMMUNICATION DEVICE, COMMUNICATION SYSTEM

TECHNICAL FIELD

The present invention relates to a technology for enhancing resistance to tampering in the form of unauthorized accesses in communications between components.

BACKGROUND ART

Some technologies improve tamper-resistance by making it difficult for any cracker to probe a signal flowing in a circuit board. For example, Patent Literature 1 discloses a method for judging whether or not an unauthorized access by probing has been performed, by outputting a detection signal to a component that is to receive a confidential signal, and detecting a waveform distortion in the detection signal received by the component.

The following describes the technology disclosed in Patent Literature 1 with reference to FIGS. 30 and 31.

FIG. 30 is a cross-sectional view of a circuit board 1000.

When a confidential signal flows from a terminal 1116 of a component 1111 to a terminal 1117 of a component 1112 (by way of a foil 1121, a via hole 1122, a foil 1123, a via hole 1126, and a foil 1127), the component 1111 outputs a detection signal, and the component 1112 receives the detection signal and checks whether or not the waveform of the received signal is normal.

FIGS. 31A through 31C illustrate examples of waveforms of the detection signal flowing between the component 1111 and the component 1112.

FIG. 31A illustrates a normal waveform of the detection signal. On the other hand, in FIGS. 31B and 31C, the solid lines indicate abnormal waveforms of the detection signal that are observed when an observation point 1113 or the like is probed.

According to Patent Literature 1, an abnormal waveform with more gradual rise or fall as illustrated in FIG. 31B is detected by comparing a period of normal reception which is stored in advance, with a period in which the potential exceeds a high reference potential 1211 or a period in which the potential falls below a low reference potential 1212. Also, an abnormal waveform with ringing occurring in the rise or fall as illustrated in FIG. 31C is detected by judging whether or not the potential exceeds a high reference potential 1221 or judging whether or not the potential falls below a low reference potential 1222.

CITATION LIST

Patent Literature

Patent Literature 1

Japanese Patent Application Publication No. 2005-116897

SUMMARY OF INVENTION

Technical Problem

However, according to the structure of Patent Literature 1, sampling needs to be performed at a frequency that is higher than a detection signal transmission frequency, to detect a change of waveform over time.

That is to say, in the case of the waveform detection as illustrated in FIG. 31B, to detect a period in which the potential exceeds the high reference potential 1221 (the potential falls below the low reference potential 1222), it is necessary to monitor the potential at very short intervals.

It is therefore an object of the present invention to provide a communication device that is well tamper-resistant although it does not detect change in waveform over time in communications between circuit boards.

Solution to Problem

The above object is fulfilled by a communication device comprising: a first circuit board in which a first component for communication is implemented; and a second circuit board in which a second component for communication is implemented, wherein a communication is performed between the first component and the second component, the first component includes a transmitting unit, a judging unit, and a control unit, the second component includes a returning unit, the transmitting unit of the first component transmits a plurality of detection signals having different frequency spectrums to the second component, upon receiving the detection signals, the returning unit of the second component returns, as return signals, respective signal waveforms of the received detection signals to the first component, the judging unit of the first component judges authenticity of the received return signals by referring to the transmitted detection signals, and when the judging unit judges that the received return signals are not authentic, the control unit adds a restriction to the communication performed between the first component and the second component.

Advantageous Effects of Invention

With the above-described structure, a plurality of detection signals having different frequency spectrums are transmitted. This makes it possible to obtain a plurality of signal waveforms reflecting the plurality of frequency spectrums, detect a change in transmission coefficient between circuit boards (on a transmission path), and provide a communication device that is well tamper-resistant although it does not detect change in waveform over time.

BRIEF DESCRIPTION OF DRAWINGS

FIG. 3 illustrates one example of data patterns generated by the pattern generating unit 124.

FIG. 26 illustrate a mobile phone 600 and the like.

FIG. 27 is a functional block diagram of the mobile phone 600 and a memory card 700.

DESCRIPTION OF EMBODIMENTS

The following describes embodiments of the present invention, with reference to the drawings.

Embodiment 1

<Structure>

Figure 1:
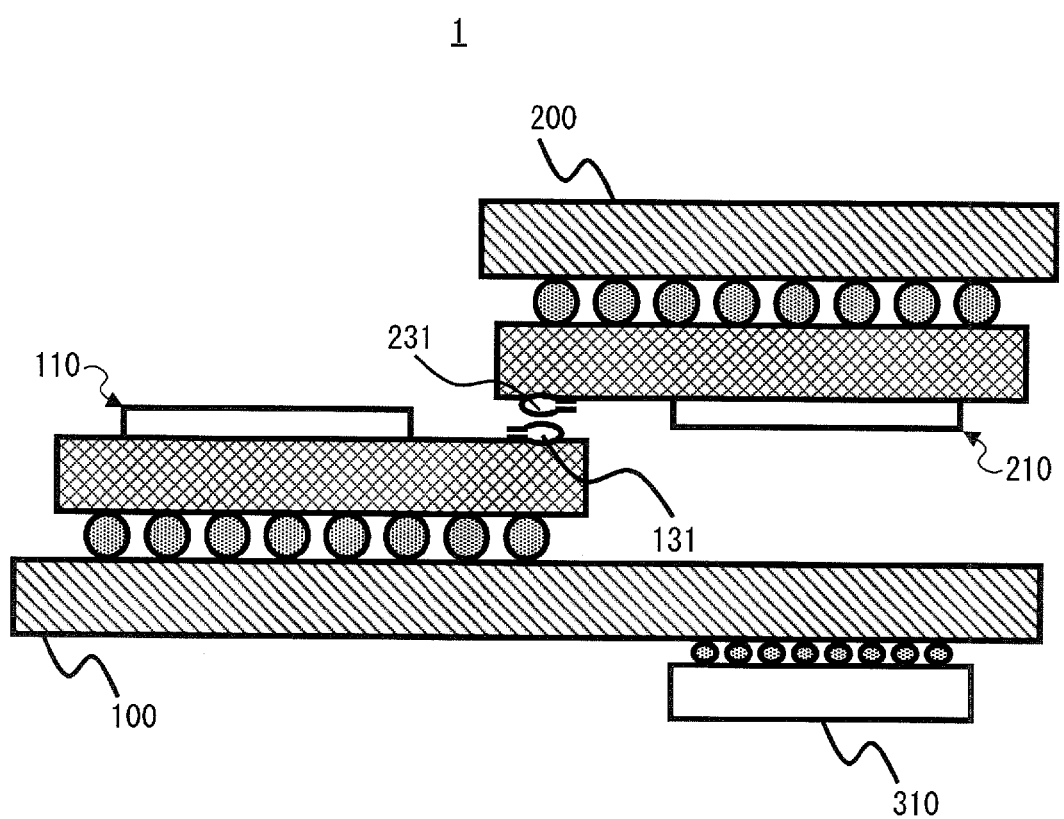
FIG. 1 is a cross-sectional view of a communication device 1 in Embodiment 1.
Figure 2:
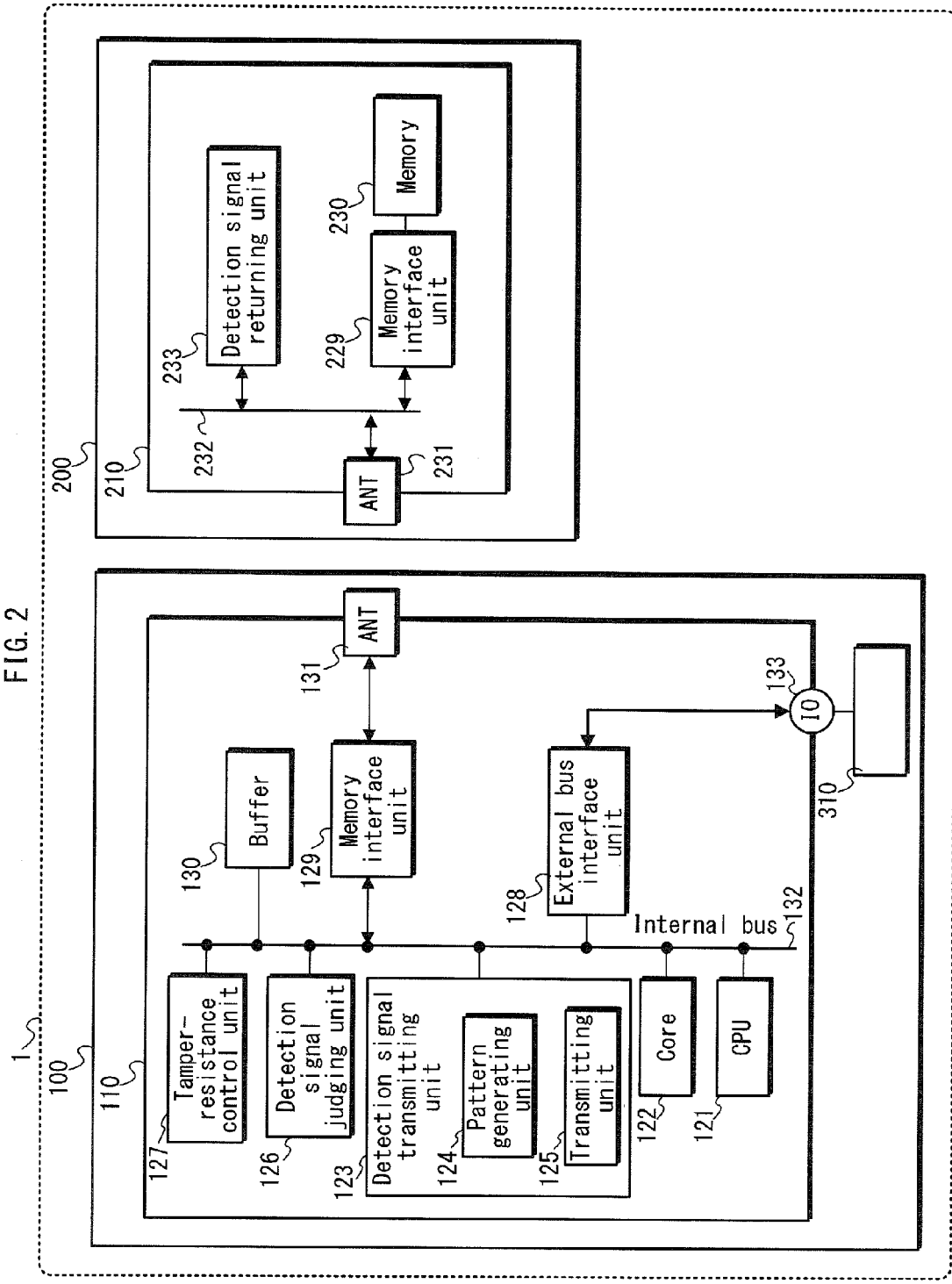
FIG. 2 is a functional block diagram of the communication device 1.

FIG. 1 is a cross-sectional view of a communication device 1. FIG. 2 is a functional block diagram of the communication device 1.

In the present embodiment, a close-coupled wireless communication method is used as one example of the communication method in the description of the case where a communication is performed between components in one communication device.

Especially in a communication band of 1 GHz or more that is used in a contactless communication, there is a problem that a circuit corresponding to a high-performance oscilloscope equipped with an A/D converter supporting a high-speed sampling is required to observe the change in waveform over time, which increases circuit area of the device and the cost. Thus, in the present embodiment, as one example, the close-coupled wireless communication method is used because it shows a great effect of the present invention over the conventional technologies.

As illustrated in FIG. 1, an antenna 131 and an antenna 231 are arranged on the package surfaces of a first component 110 and a second component 210, respectively.

Also, the first component 110 and a third component 310 are connected with each other on a first circuit board 100 by a conductive wire.

A wireless communication is performed between the first component 110 and the second component 210 in the state where an antenna 131 is in close contact with an antenna 231 (for example, with a gap of 2 mm or less therebetween), by using the inductive coupling (magnetic field coupling) between the antennas.

In particular, when a block such as a CPU 121 or a core 122 that is mounted on the first component 110 transmits or receives a confidential signal to/from the second component 210, a request for permission of transmission or reception is sent to a tamper-resistance control unit 127, and the confidential signal (hereinafter, the confidential signal is referred to as "confidential data") is transmitted or received to/from the second component 210 only when the permission is granted.

As illustrated in FIG. 2, the communication device 1 includes the first circuit board 100 on which the first component 110 and the third component 310 are mounted, and a second circuit board 200 on which the second component 210 is mounted.

The first component 110 includes a CPU 121, a core 122, a detection signal transmitting unit 123, a detection signal judging unit 126, a tamper-resistance control unit 127, an external bus interface unit 128, a memory interface unit 129, a buffer 130, an antenna 131, an internal bus 132, and an external terminal 133.

The second component 210 includes an internal bus 232, a memory interface unit 229, a memory 230, an antenna 231, and a detection signal returning unit 233.

Note that, although in the example illustrated in FIG. 2, the first component 110 is a system LSI and the second component 210 is a memory, the first and second components may be other components and can be combined in various ways.

Here, the CPU 121 is a block that is realized by a general-purpose microcomputer or the like and controls the first component 110, and the core 122 is a block that is dedicated to a special purpose and is realized by an image codec engine or the like.

The detection signal transmitting unit 123 includes a pattern generating unit 124 and a transmitting unit 125, wherein the pattern generating unit 124 generates a plurality of data patterns, and the transmitting unit 125 transmits, via the antenna 131, a detection signal that is obtained by modulating a carrier signal based on the bits that constitute bit sequences of the generated data patterns.

The detection signal judging unit 126 judges the authenticity of a return signal sent from the second component 210.

The tamper-resistance control unit 127 is a functional block that ensures the tamper-resistance of the confidential data. More specifically, when the judgment result of the detection signal judging unit 126 indicates non-authenticity, the tamper-resistance control unit 127 prohibits a block (for example, the CPU 121), which is to transmit or receive confidential data, from transmitting or receiving the confidential data. On the other hand, when the judgment result of the detection signal judging unit 126 indicates authenticity, the tamper-resistance control unit 127 permits a block, which is to transmit or receive confidential data, to transmit or receive the confidential data.

Also, the tamper-resistance control unit 127 transmits a signal indicating the judgment result of the detection signal judging unit 126 to the second component 210 that is a communication partner.

The external bus interface unit 128 is an interface that connects the first component 110 with the third component 310.

A buffer 130 temporarily stores data patterns that correspond to a detection signal transmitted by the detection signal transmitting unit 123.

The antennas 131 and 231 may be, for example, coil antennas composed of conductive wires formed in the shape of loops, capacitor antennas that are lands on substrate surfaces arranged to face each other, or commercial antennas.

The detection signal returning unit 233 of the second component 210 returns a return signal reflecting a detection signal transmitted from the detection signal transmitting unit 123 of the first component 110.

More specifically, the detection signal returning unit 233 is composed of a loopback circuit that buffers a received detection signal, and after the reception is completed, returns the buffered detection signal to the transmitter of the signal as it is.

The memory 230 is composed of, for example, a flash memory or a DDR memory.

Next, a description is made of data patterns. FIG. 3 illustrates a table 124a that contains, as one example, data patterns generated by the pattern generating unit 124 of the detection signal transmitting unit 123.

As illustrated in FIG. 3, the data pattern A includes a bit sequence 01010101 as "frequency 1", a bit sequence 0011001100110011 as "frequency 2", a bit sequence 000111000111000111000111 as "frequency 3", and a bit sequence 0000111100001111000011110000111 as "frequency 4".

In this way, based on "frequency 1" which is a bit sequence composed of a plurality of sequences of 01 that is a sequence of 0 and 1, the "frequency 2", "frequency 3" and "frequency 4" are respectively bit sequences composed of sequences of 0s and 1s that are each double, triple and quadruple as many as each 0 and each 1 constituting the bit sequence of "frequency 1". The above-described relationship among "frequency 1", "frequency 2", "frequency 3" and "frequency 4" is applied to the other data patterns B through F, as well.

In table 124a, "frequency 1" is the highest frequency in a range of frequencies used in transmissions by the detection signal transmitting unit. The "frequency 2", "frequency 3" and "frequency 4" are respectively ½, ⅓ and ¼ of the highest frequency. This indicates that since the numbers of 0s and 1s in "frequency 2" to "frequency 4" are multiples of those of "frequency 1", data of "frequency 2" to "frequency 4" are redundant, and the substantial transmission data rate thereof is lower than that of "frequency 1". For example, when the transmission data rate of "frequency 1" (actual size) is 4 Gbps, the transmission data rate of "frequency 2" (½) is 2 Gbps, the transmission data rate of "frequency 3" (⅓) is approximately 1.3 Gbps, and the transmission data rate of "frequency 4" (¼) is 1 Gbps.

When various data patterns as illustrated in FIG. 3 are used in the detection signal, it is possible to include various frequency spectrums into the detection signal, and increase the probability of detecting a change in transmission characteristics that is caused by probing.

<Operation>

Figure 4:
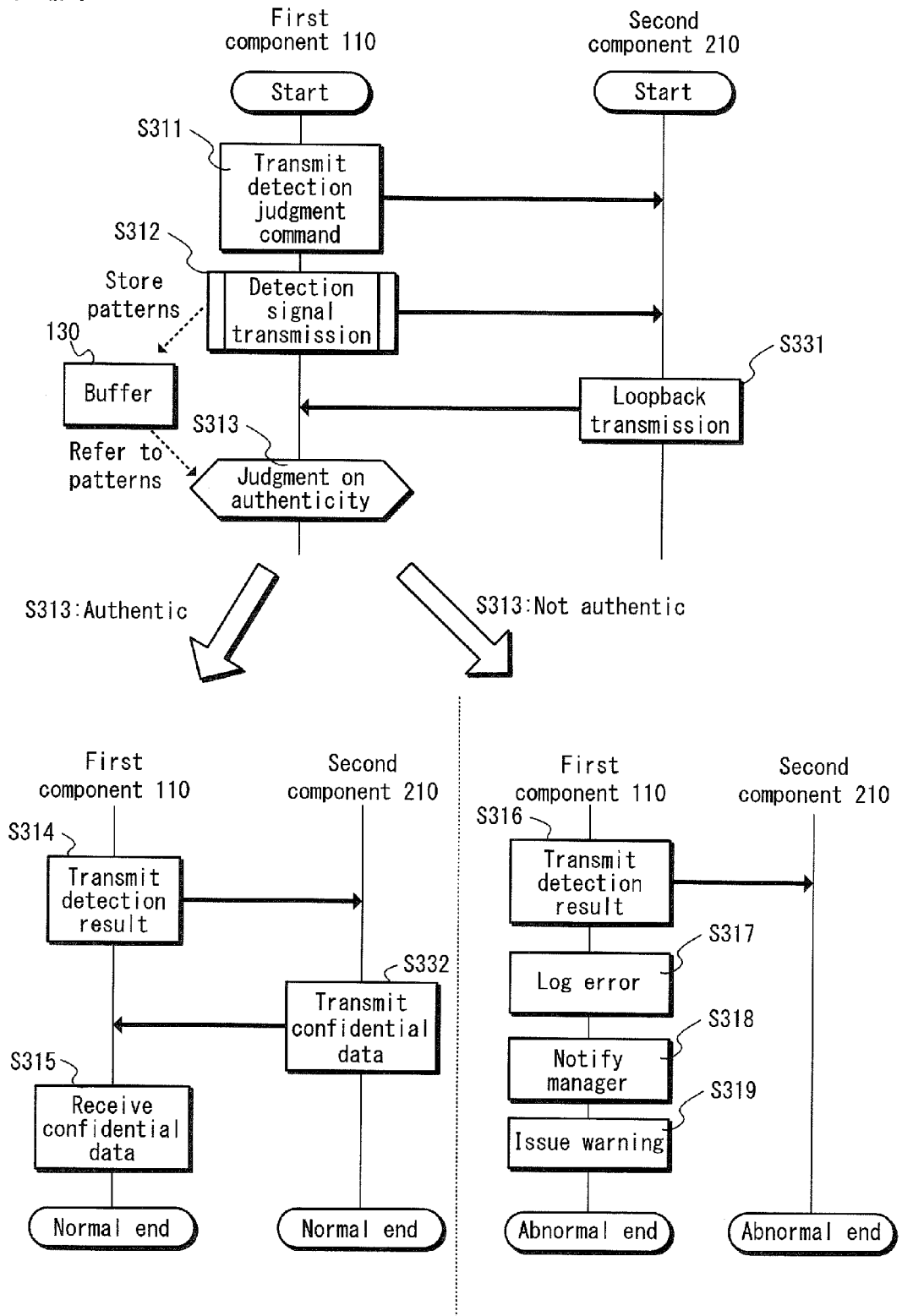
FIG. 4 illustrates a process flow of a transmission/reception of confidential data.

The following describes the flow of the process for transmitting or receiving confidential data between the first component 110 and the second component 210, with reference to FIG. 4.

Note that, although the following description takes, as one example, the case where the CPU 121 receives confidential data from the second component 210, the direction of the transmission/reception is not limited to this, and the subject of the transmission/reception is not limited to the CPU 121, but may be another functional block such as the core 122.

First, upon receiving a request for reception of confidential data from the CPU 121, the tamper-resistance control unit 127 transmits a detection judgment command to the second component 210 (S311). Upon receiving the detection judgment command, the detection signal returning unit 233 of the second component is prepared for a loopback transmission that is to follow, by obtaining the right to use the antenna 231, internal bus 232 and the like.

Following this, the tamper-resistance control unit 127 instructs the detection signal transmitting unit 123 to transmit a detection signal. Upon receiving the instruction, the pattern generating unit 124 of the detection signal transmitting unit 123 generates data patterns as illustrated in FIG. 3, and the transmitting unit 125 transmits a detection signal that is obtained by modulating a carrier signal based on the bits that constitute the bit sequences of the generated data patterns. Also, the buffer 130 stores data patterns that correspond to the transmitted detection signal (S312). Details of the transmission are described below with reference to FIG. 5.

Upon receiving the detection signal, the detection signal returning unit 233 of the second component 210 transmits the received signal as the return signal without changing the signal waveform, to the first component 110 (S331: loopback transmission).

The detection signal judging unit 126 receives the return signal, demodulates it, and extracts bit sequences therefrom. The detection signal judging unit 126 then identifies bit sequences of the transmitted detection signal that corresponds to the received return signal, from among the data patterns stored in the buffer 130.

Subsequently, the detection signal judging unit 126 compares the extracted bit sequences with the identified bit sequences, and judges the authenticity of the received return signal based on the identity in arrangement between the two sets of bit sequences (S313).

When it is judged in step S313 that the received return signal is authentic, the tamper-resistance control unit 127 notifies the CPU 121 that the confidential data is permitted to be received, and transmits the detection result to the second component 210 (S314). Upon receiving the detection result, the detection signal returning unit 233 of the second component 210 transmits the right to use the internal bus 232 to the memory interface unit 229, and the memory interface unit 229 permits an external access to the memory 230.

After this, the CPU 121 starts receiving the confidential data from the memory 230 of the second component 210 (S332, S315).

When it is judged in step S313 that the received return signal is not authentic, the tamper-resistance control unit 127 notifies the CPU 121 that the confidential data is not permitted to be received, and transmits the detection result to the second component 210 (S316). Upon receiving these notifications, the CPU 121 and the memory interface unit 229 add a restriction to the access to the confidential data (stop transmission/reception of the confidential data).

Note that, instead of, or together with, adding a restriction to the access, an error may be logged (S317), a notification of an unauthorized access may be sent to the manager (S318), the first component may issue a warning (S319), the system operation may be stopped, or a log of unauthorized access may be transmitted to the manufacturer.

Furthermore, the process illustrated in FIG. 4 may be performed when the system is started, may be performed as a check before the confidential signal is transmitted, or may be performed as a check at predetermined intervals. Also, the judgment result of the detection signal judging unit 126 may be treated as a key to start a transmission of confidential data.

<Example of Detection Signal Transmission>

Here, an example of the detection signal transmission (S312) is described with reference to FIG. 5.

First the detection signal transmitting unit 123 resets the counter value (S41). Subsequently, the detection signal transmitting unit 123 repeatedly performs the process of generating and transmitting data patterns according to the table 124a illustrated in FIG. 3.

More specifically, for example, the bit sequences of the data pattern A are transmitted in the following order (S42A).

a bit sequence 01010101 . . . of "frequency 1", a bit sequence 0011001100110011 . . . of "frequency 2", a bit sequence 000111000111000111000111 . . . of "frequency 3", a bit sequence 0000111100001111000011110000111 . . . of "frequency 4",

. . .

a bit sequence . . . of "frequency 30".

Note that the number of bit sequences to be transmitted (or the transmission time period) is a predetermined value.

Subsequently, the detection signal transmitting unit 123 transmits the bit sequences of the data pattern B in the following order (S42B).

a bit sequence 01101010 . . . of "frequency 1", a bit sequence 0011110011001100 . . . of "frequency 2",

. . .

a bit sequence . . . of "frequency 30".

Furthermore, the detection signal transmitting unit 123 transmits the data patterns C and D in a similar manner (S42C, S42D).

Upon completion of the transmission process performed in steps S42A through S42D, the detection signal transmitting unit 123 increments the counter value by one (S43), and repeats the process of steps S42A through S42D until the counter value reaches 10 (S44).

Figure 5:
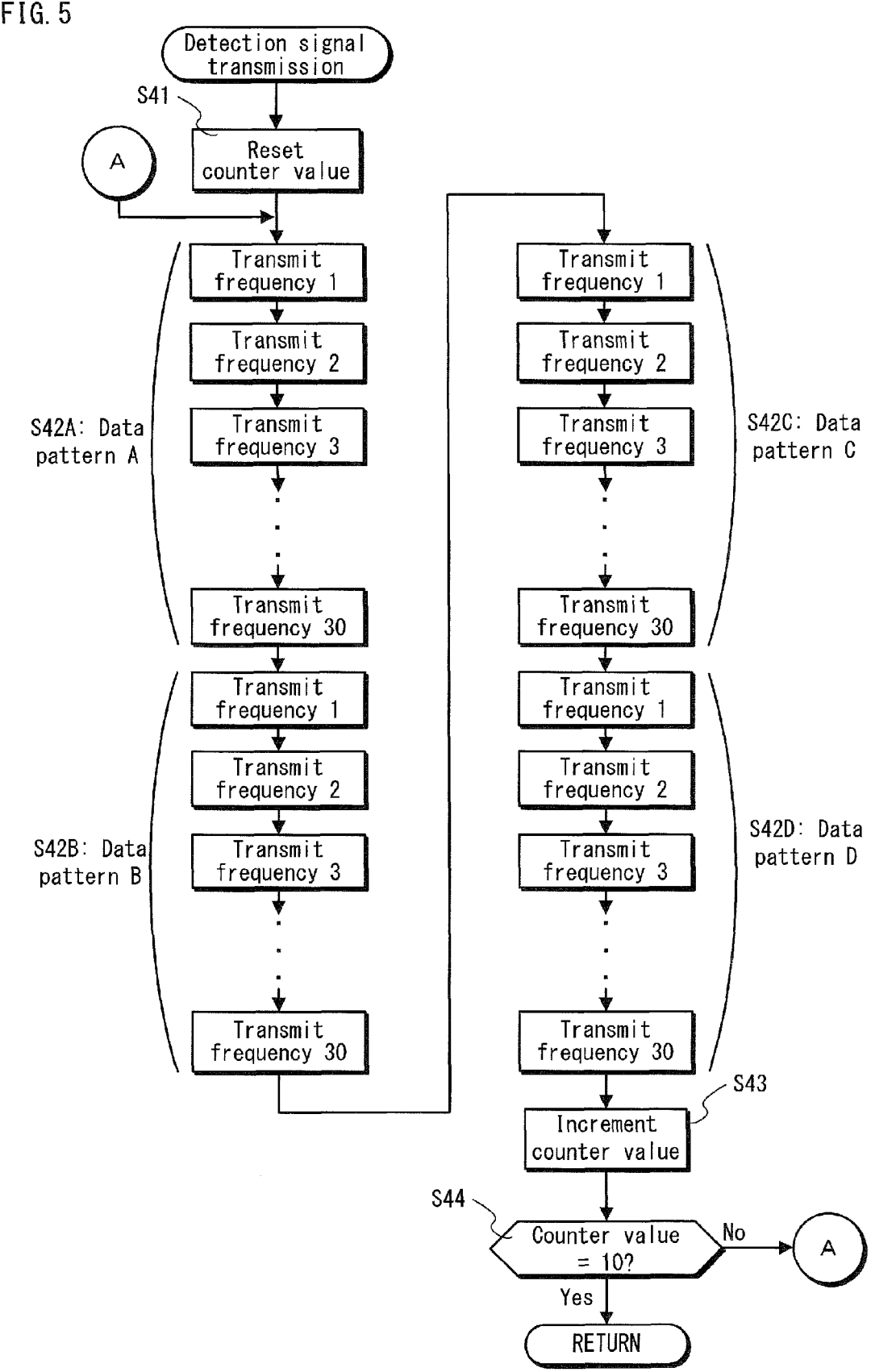
FIG. 5 illustrates a flow of a detection signal transmission process performed by the detection signal transmitting unit 123.

The transmission illustrated in FIG. 5 is merely one example, and the data patterns used for a transmission, the order in which the data patterns are transmitted, the combination of the data patterns, the number of repetitions and the like can be set as appropriate.

<Examples of Waveforms of Detection Signal and Return Signal>

The following describes examples of waveforms of the detection signal and the return signal, with reference to FIGS. 6 to 9.

Figure 6:
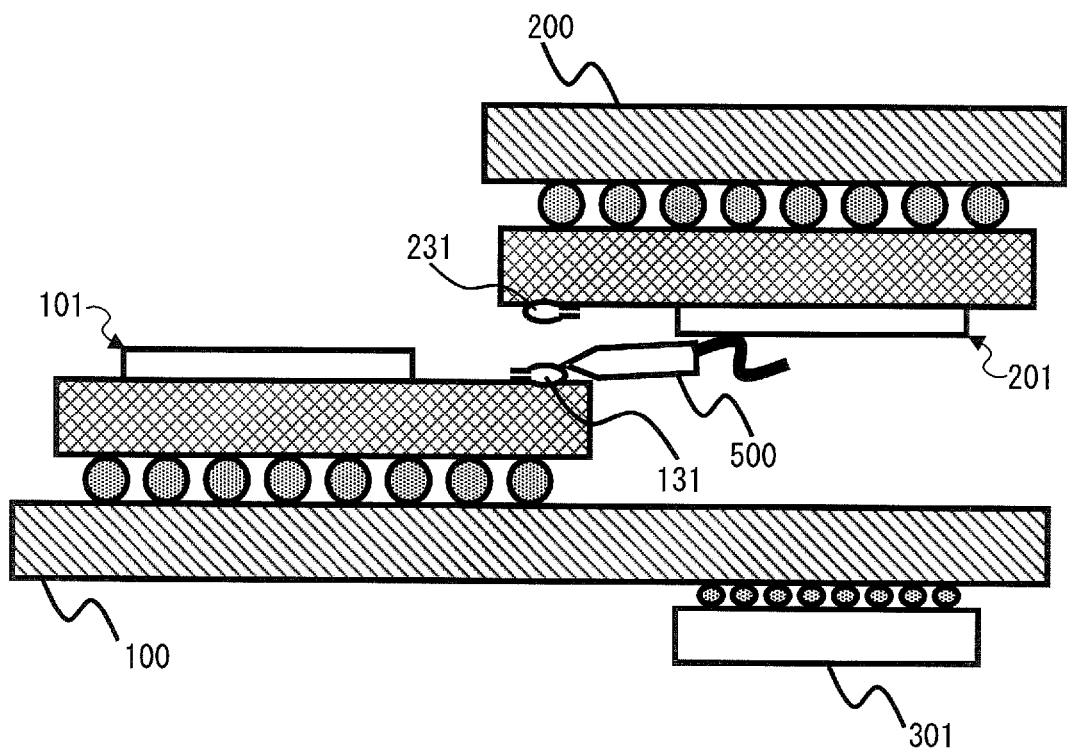
FIG. 6 is a cross-sectional view of the communication device 1 in the state where a probe is set up.

FIG. 6 is a cross-sectional view of the communication device 1. The figure indicates that, compared to FIG. 1, the distance between the antennas 131 and 231 is slightly longer, and the antenna 131 is contacted with a probe 500 of a measuring instrument (for example, an oscilloscope). The figure illustrates the state where the probe 500 is attempting an unauthorized access to confidential data that flows through the antenna 131.

In a short-distance wireless communication using the magnetic field coupling technology or the capacitance coupling technology, even a slight change in the distance between antennas or an addition of a probe greatly affects the transmission characteristics of the antennas, and causes changes in frequency bands at which the normal transmission is available, and in frequency bands at which the normal transmission is difficult.

Figure 7:
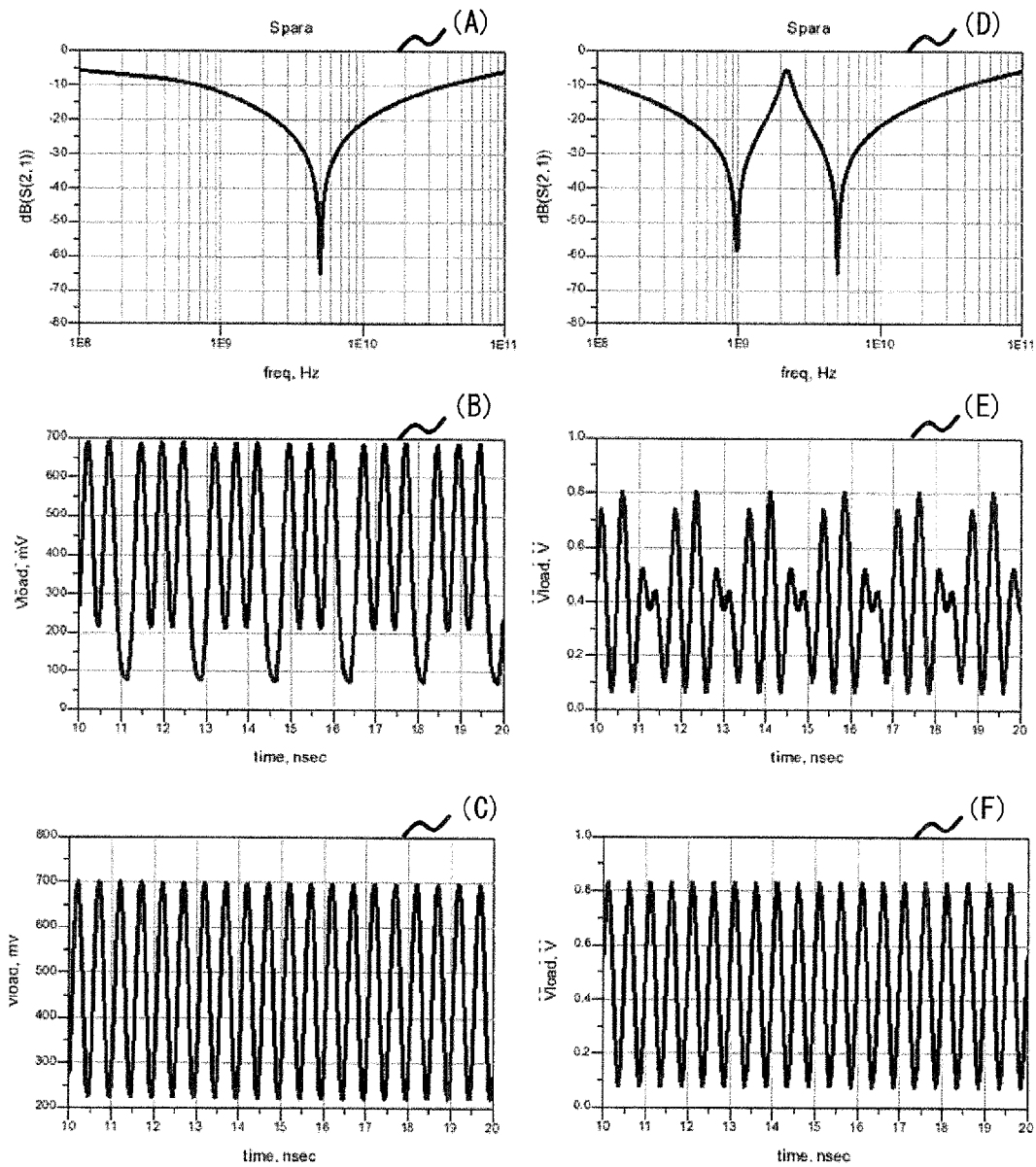
FIG. 7 illustrates transmission characteristics of the transmission path and transmission results of data transmission at the transmission data rate of 4 Gbps.
Figure 8:
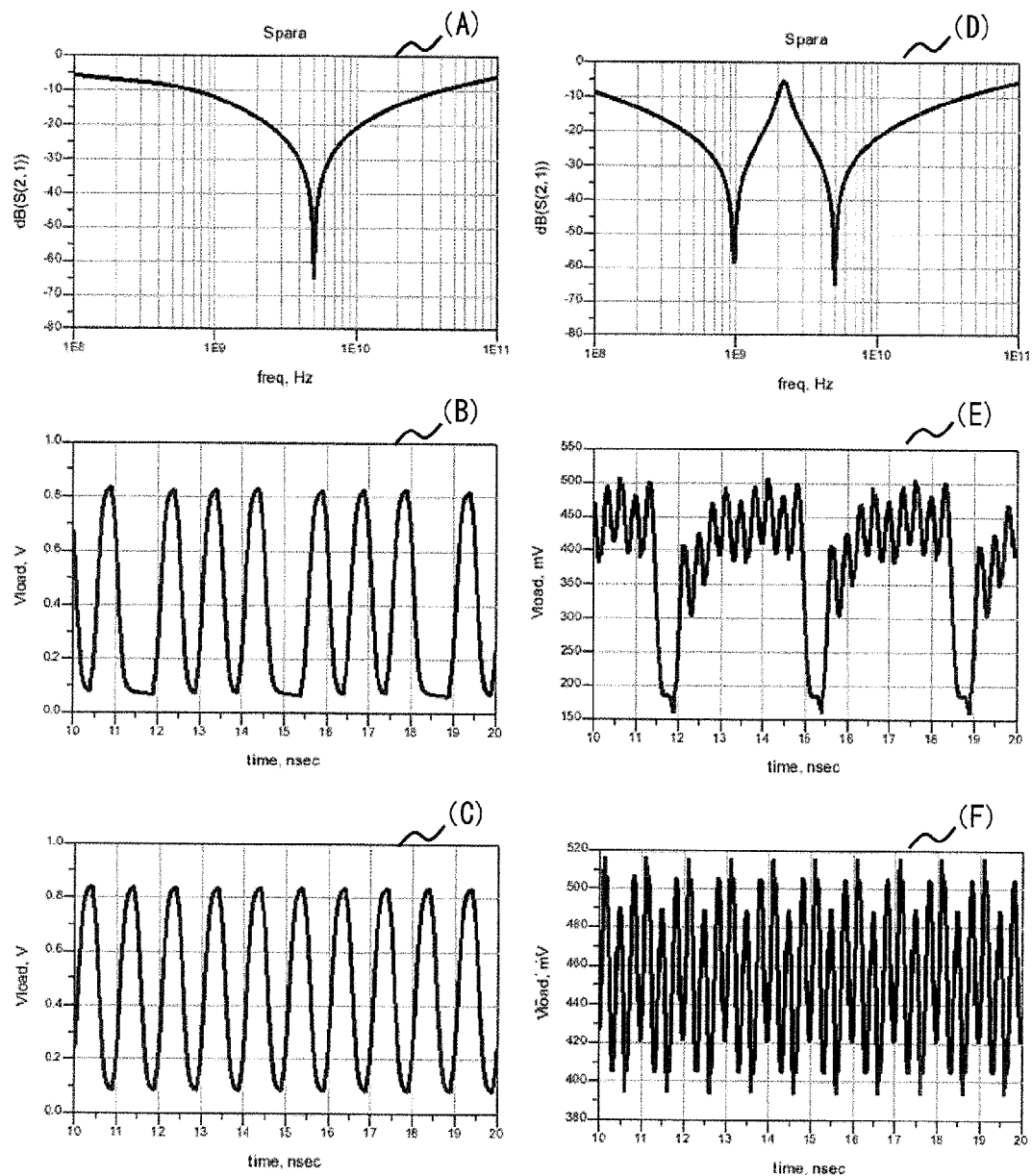
FIG. 8 illustrates transmission characteristics of the transmission path and transmission results of data transmission at the transmission data rate of 2 Gbps.
Figure 9:
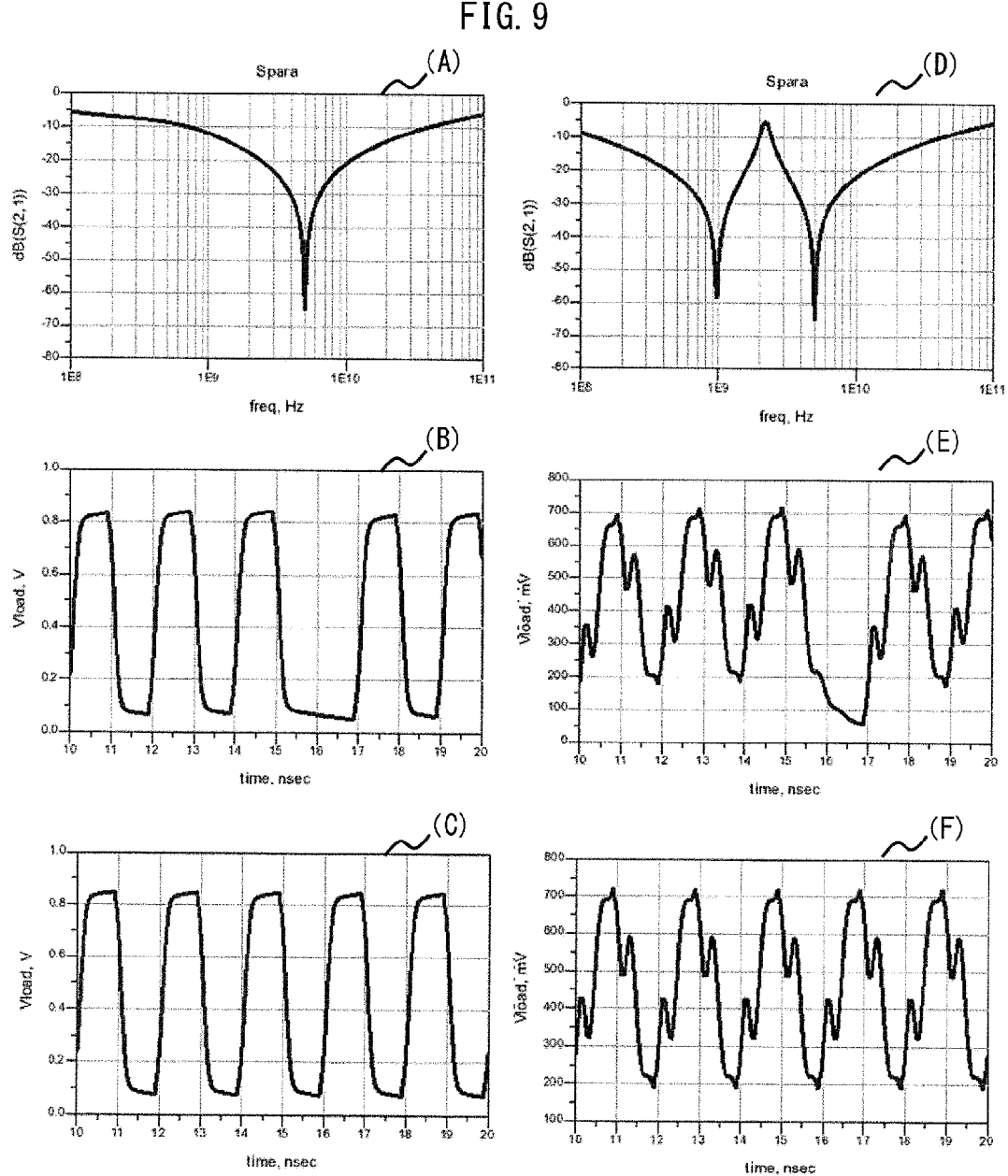
FIG. 9 illustrates transmission characteristics of the transmission path and transmission results of data transmission at the transmission data rate of 1 Gbps.

In FIGS. 7 to 9, the graphs (A) to (C) on the left-hand side indicate characteristics of normal transmission without probing; and the graphs (D) to (F) on the right-hand side indicate characteristics of transmissions in which a probe is performing an unauthorized access (FIG. 5).

The graphs (A) and (D) in FIGS. 7 to 9 indicate transmission characteristics between the antennas 131 and 231. Also, the graphs (B), (C), (E) and (F) indicate waveforms of detection signals received by the antenna 131 (in each graph, the transmission clock frequency is 4 GHz)

Relationships between the graphs (B), (C), (E) and (F) illustrated in FIGS. 7 to 9 and the data patterns illustrated in FIG. 3 are as follows.

Graphs (B) and (E) illustrated in FIG. 7 . . . "frequency 1" of data pattern E

Graphs (C) and (F) illustrated in FIG. 7 . . . "frequency 1" of data pattern F

Graphs (B) and (E) illustrated in FIG. 8 . . . "frequency 2" of data pattern E

Graphs (C) and (F) illustrated in FIG. 8 . . . "frequency 2" of data pattern F

Graphs (B) and (E) illustrated in FIG. 9 . . . "frequency 4" of data pattern E

Graphs (C) and (F) illustrated in FIG. 9 . . . "frequency 4" of data pattern F

Relationships between FIGS. 7 to 9 are explained as follows. For example, graph (B) of FIG. 7 represents transmission of bit sequence 1010100 at transmission data rate of 4 Gbps, while graph (B) of FIG. 8 represents transmission of bit sequence 11001100110000, and its substantial transmission data rate is 2 Gbps, namely half of graph (B) of FIG. 7, since the number of 0s and 1s is double, and thus the transmission period of the high and low potentials of the detection signals is double that of graph (B) of FIG. 7. In this way, although the transmission frequency is 4 GHz in all of FIGS. 7 to 9, the transmission data rates in FIGS. 7, 8 and 9 are 4 Gbps, 2 Gbps and 1 Gbps, respectively.

As can be seen in FIGS. 7 to 9, graph (A) and graph (D) are different in antenna transmission characteristics. The reason is that the antenna transmission characteristics change from graph (A) to graph (D) since the antenna transmission characteristics are influenced by increase of the gap between antennas 118 and 218 by insertion of the probe 500, and also by the insertion of the probe 500 itself. It can be seen that in graph (D), an attenuation peak is generated in the vicinity of the frequency of 1E9.

As described above, a difference in transmission characteristics appears as a difference in waveform as shown in graphs (B) and (E). It is thus possible to use this difference to judge whether or not an unauthorized access is attempted.

More specifically, upon receiving a return signal as illustrated in graph (E), the detection signal judging unit 126 demodulates the return signal, judges whether a bit sequence of the demodulated signal is "1010100". Then when the bit sequence is "1010100", the detection signal judging unit 126 outputs a judgment result that the received return signal is authentic, and when the bit sequence is not "1010100", the detection signal judging unit 126 outputs a judgment result that the received return signal is not authentic.

As described above, based on the judgment result, the tamper-resistance control unit 127 controls the permission/non-permission of transmission/reception of the confidential data.

Note that the difference between graphs (C) and (F) in FIG. 7 is relatively small. This is considered to be because the frequency spectrum of the detection signal used in the graphs (C) and (F) does not contain the 1E9 component much. On the other hand, in FIG. 8, the difference between graphs (B) and (E) is remarkable, and such a difference can be detected easily.

In this way, according to the present embodiment, the variation of frequency spectrums included in the detection signal is increased, which makes it possible to detect a change in the transmission characteristics of a specific frequency spectrum caused by the probing, and thus it becomes unnecessary to detect change in waveform over time as has been done conventionally. The structure of the present embodiment as such makes it possible to detect whether or not an unauthorized access is made, and to improve the tamper-resistance in transmission of a confidential signal.

Also, the present embodiment makes it possible to, in a communication method in which the transmission frequency of a GHz band is used, detect the transmission characteristics of transmission paths that use bands ranging from the highest frequency band to the lowest frequency band, at a low cost.

Also, in the present embodiment, almost all the functions necessary for detection of unauthorized accesses (the tamper-resistance control unit 127, detection signal judging unit 126, and detection signal transmitting unit 123) can be included in the first component 110, and the second component 210 includes merely the detection signal returning unit 233. Accordingly, in the present embodiment, especially the second component 210 can be realized with a relatively low cost.

<Examples of Structure and Arrangement>

Here, examples of the structure and arrangement that are different from those shown in FIG. 1 are explained.

In the example shown in FIG. 1, the antenna 131 is mounted on the first component 110. However, the present invention is not limited to this structure.

Figure 10:
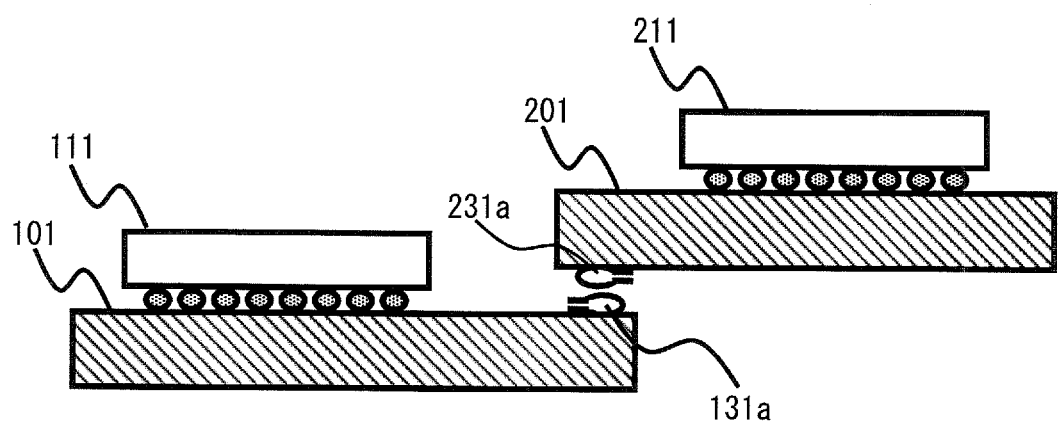
FIG. 10 is a cross-sectional view of a communication device.

As illustrated in FIG. 10, an antenna 131*a* may be arranged on a circuit board 101, not on a first component 111. In FIG. 10, also an antenna 231*a* is arranged on a circuit board 201, not on a second component 211.

Figure 11:
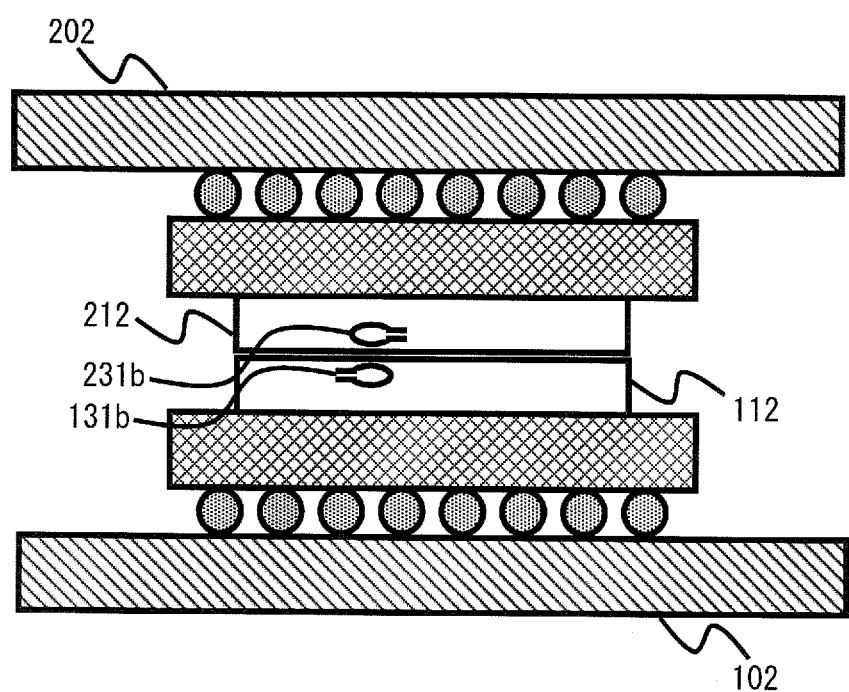
FIG. 11 is a cross-sectional view of a communication device.

As another example, as illustrated in FIG. 11, an antenna 131*b* and an antenna 231*b* may be arranged in the bare chips of a first component 112 of a first circuit board 102 and a second component 212 of a second circuit board 202, respectively.

Figure 12:
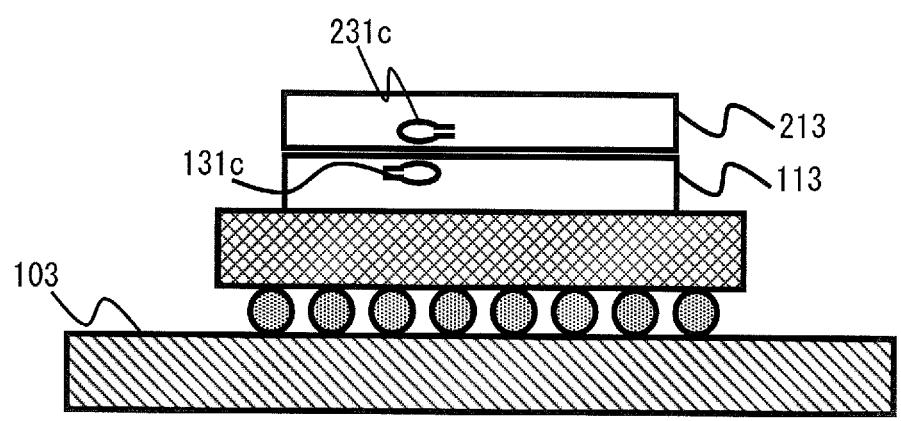
FIG. 12 is a cross-sectional view of a communication device.

As a further example, as illustrated in FIG. 12, bare chips of a first component 113 (including an antenna 131) and a second component 213 (including an antenna 231*c*) may be laminated on a circuit board 103 so that these components are arranged in a same package.

<Examples of Probe Addition>

Here, examples of probe addition that are different from those shown in FIG. 6 are explained.

In the example shown in FIG. 6, the probe 500 is inserted between antennas provided between the circuit boards. However, the form of the probe addition is not limited to this example.

Figure 13:
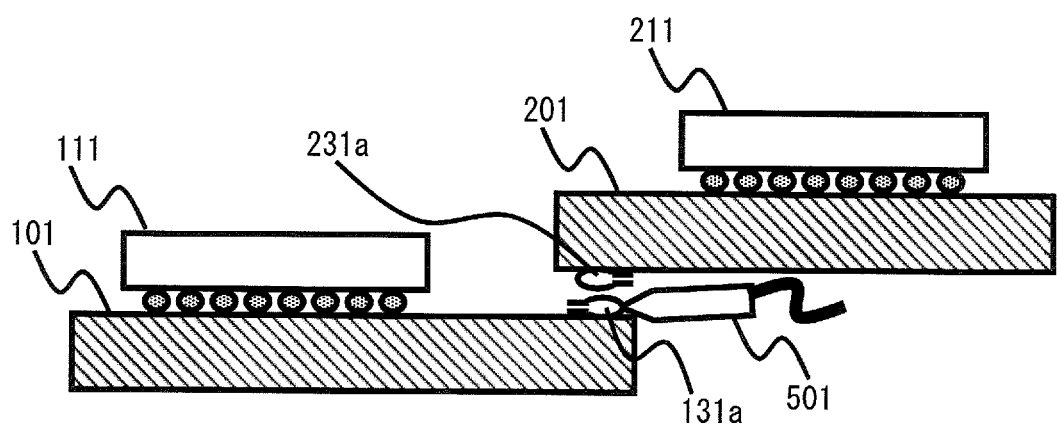
FIG. 13 is a cross-sectional view of a communication device with a probe having been added to the communication device illustrated in FIG. 10.
Figure 14:
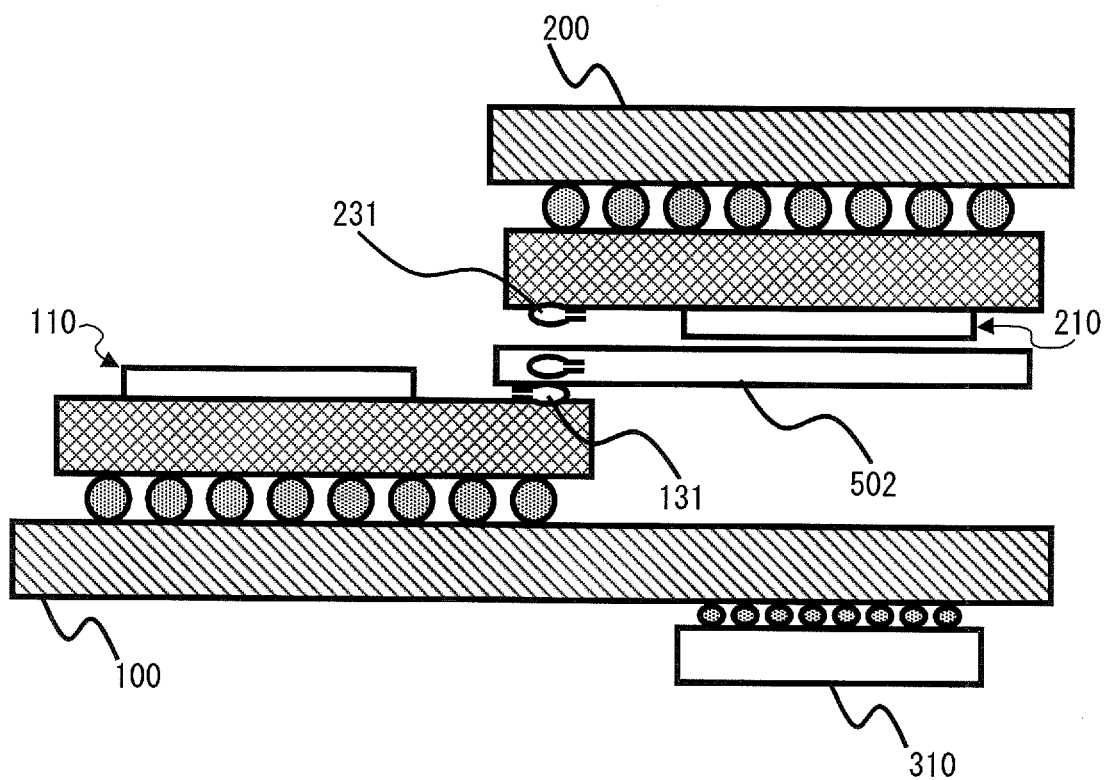
FIG. 14 is a cross-sectional view of a communication device with a probe having been added to the communication device illustrated in FIG. 1.
Figure 15:
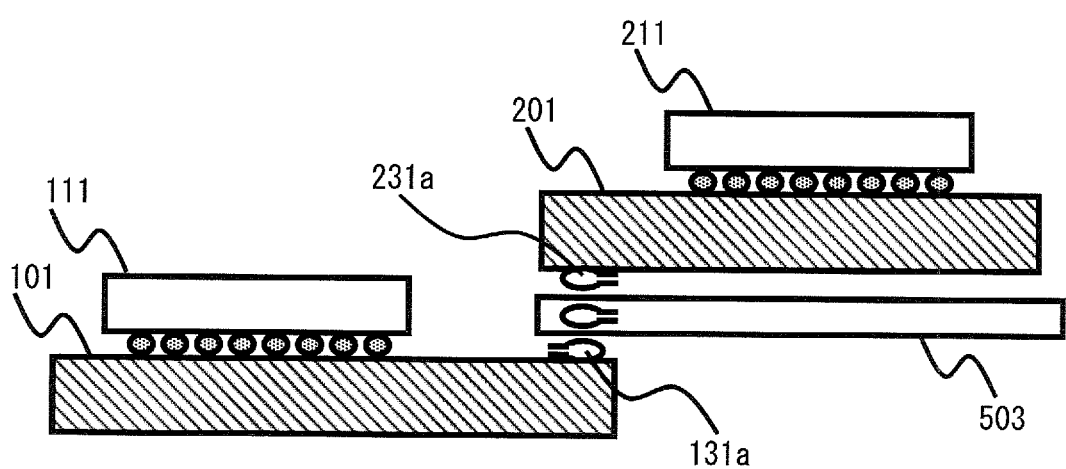
FIG. 15 is a cross-sectional view of a communication device with a loop antenna having been added to the communication device illustrated in FIG. 10.
Figure 16:
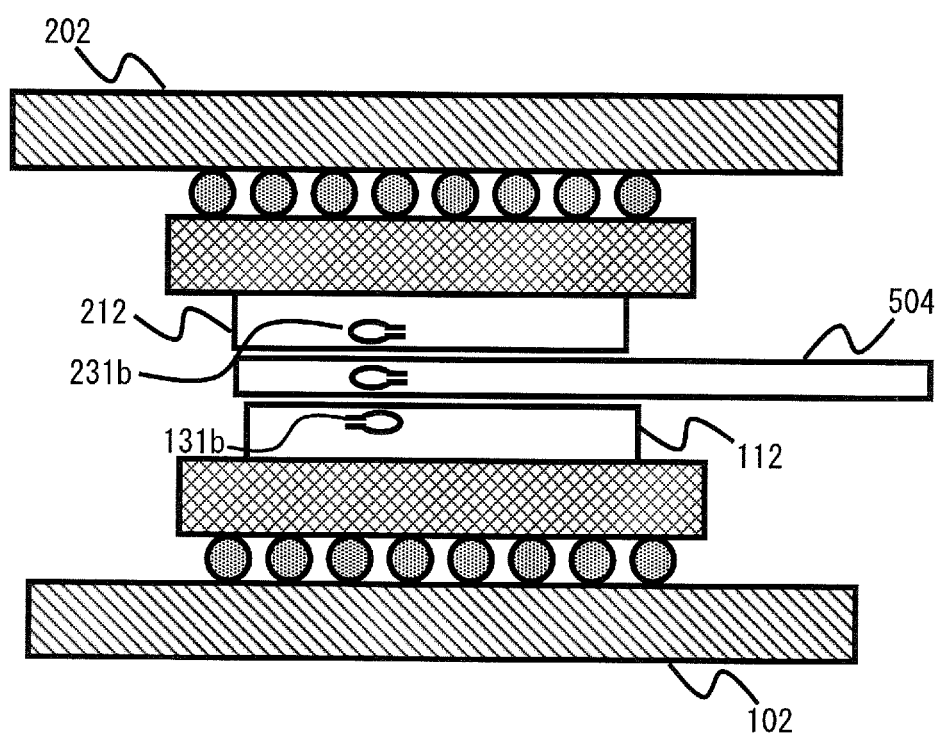
FIG. 16 is a cross-sectional view of a communication device with a loop antenna having been added to the communication device illustrated in FIG. 11.
Figure 17:
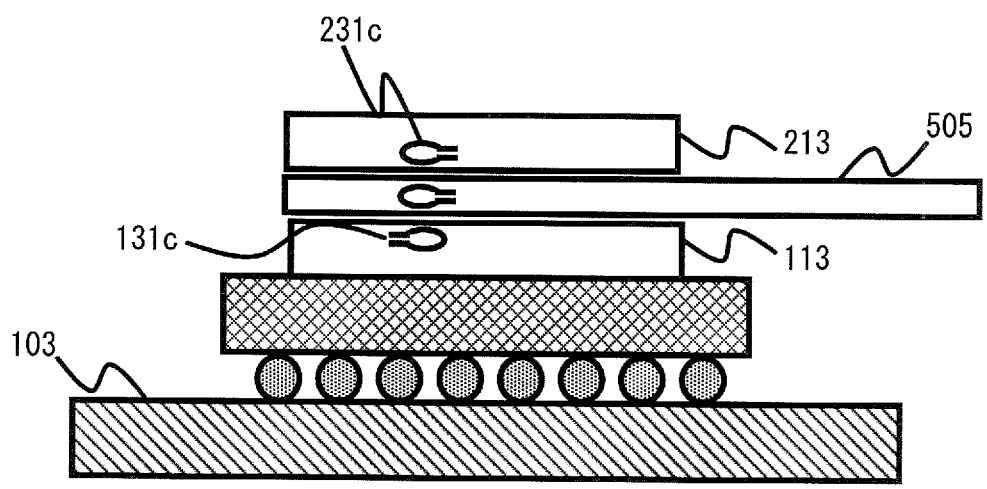
FIG. 17 is a cross-sectional view of a communication device with a loop antenna having been added to the communication device illustrated in FIG. 12.

For example, as illustrated in FIG. 13, a probe 501 may be inserted between antennas provided between the circuit boards.

Also, what might be added in an unauthorized manner is not limited to a probe. For example, as illustrated in FIGS. 14 to 17, a loop antenna (502, 503, 504, 505) or the like may be inserted between antennas. In that case, the gap between the antennas or the antenna transmission characteristics may change, and the effect described in the present embodiment can be obtained.

<Examples of Return Signal that is not Loopback>

In the above description, the detection signal returning unit 233 returns a received detection signal as it is (performs a loopback transmission). However, the present invention is not limited to this structure.

Figure 18:
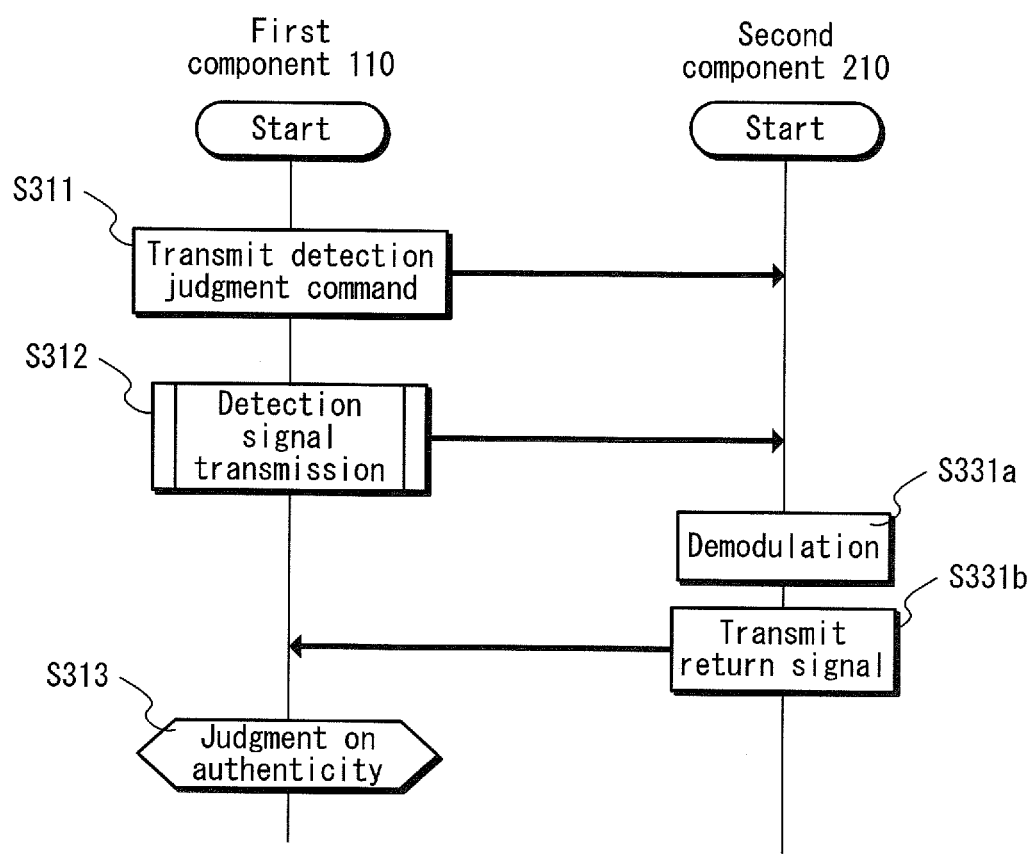
FIG. 18 illustrates a process flow of a transmission/reception of confidential data.

For example, as illustrated in FIG. 18, the detection signal returning unit 233 may demodulate the received detection signal (S331*a*), and transmit a signal obtained by modulating the demodulated information, as a return signal (S331*b*). Such a structure is effective when the demodulation capability of the detection signal returning unit 233 is excellent, or when it is desired to reduce the processing load on the first component 110 (especially, the detection signal judging unit 126).

<Others>

In the reception circuit of the detection signal judging unit 126, the threshold voltage may be set to 0 V when a difference input buffer is used to receive a signal, or may be adjusted to the upper or lower voltage by a user setting or the like. With such a structure, it is possible to detect change in signal waveform with more sensitivity, and thus it is expected to improve the tamper-resistance.

Also, when a one-way communication is performed between the antenna 131 of the first component 110 and the antenna 231 of the second component 210, the transmission/reception direction may be switched after a detection signal is received, and then the detection signal may be returned. When, for example, the first component 110 and the second component 210 each have a plurality of antennas and a two-way communication is possible therebetween, the second component 210 may return a return signal immediately after it receives a signal.

Embodiment 2

In Embodiment 2, different from Embodiment 1, the second component judges the authenticity of the detection signal. When the first component judges the authenticity of the detection signal, it uses a signal that has passed through the second component, namely a so-called round-trip signal. On the other hand, when the second component judges the authenticity of the detection signal, it uses a one-way signal, and thus it is possible to detect a change in transmission characteristics with more accuracy.

Figure 19:
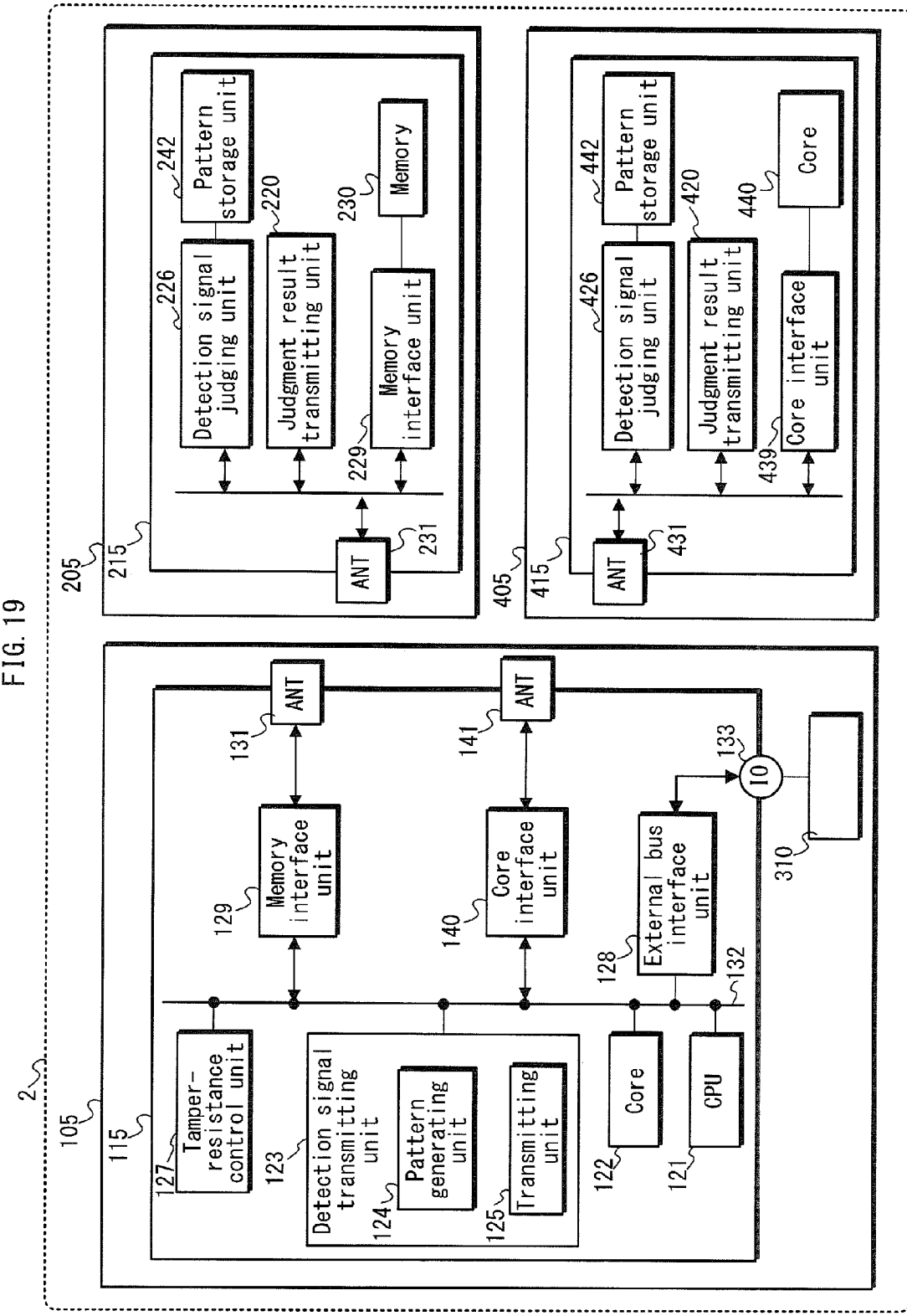
FIG. 19 is a functional block diagram of a communication device 2 in Embodiment 2.

FIG. 19 is a block diagram of a communication device 2 in Embodiment 2. In FIG. 19, the same reference numbers are assigned to the same components as those illustrated in FIG. 2, and description thereof is omitted.

A first component 115 of a first circuit board 105 includes a core interface unit 140 and an antenna 141 for performing a data transmission/reception with a fourth component 415 of a fourth circuit board 405.

A second component 215 of a second circuit board 205 includes a pattern storage unit 242, a detection signal judging unit 226, and a judgment result transmitting unit 220.

The pattern storage unit 242 stores patterns of a detection signal to be received. The contents of the pattern storage unit 242 are, for example, the same as those illustrated in FIG. 3.

The detection signal judging unit 226 judges, by referring to the information stored in the pattern storage unit 242, the authenticity of a detection signal received from the first component 115.

The judgment result transmitting unit 220 transmits the judgment result of the detection signal judging unit 226 to the first component 115.

<Operation>

Figure 20:
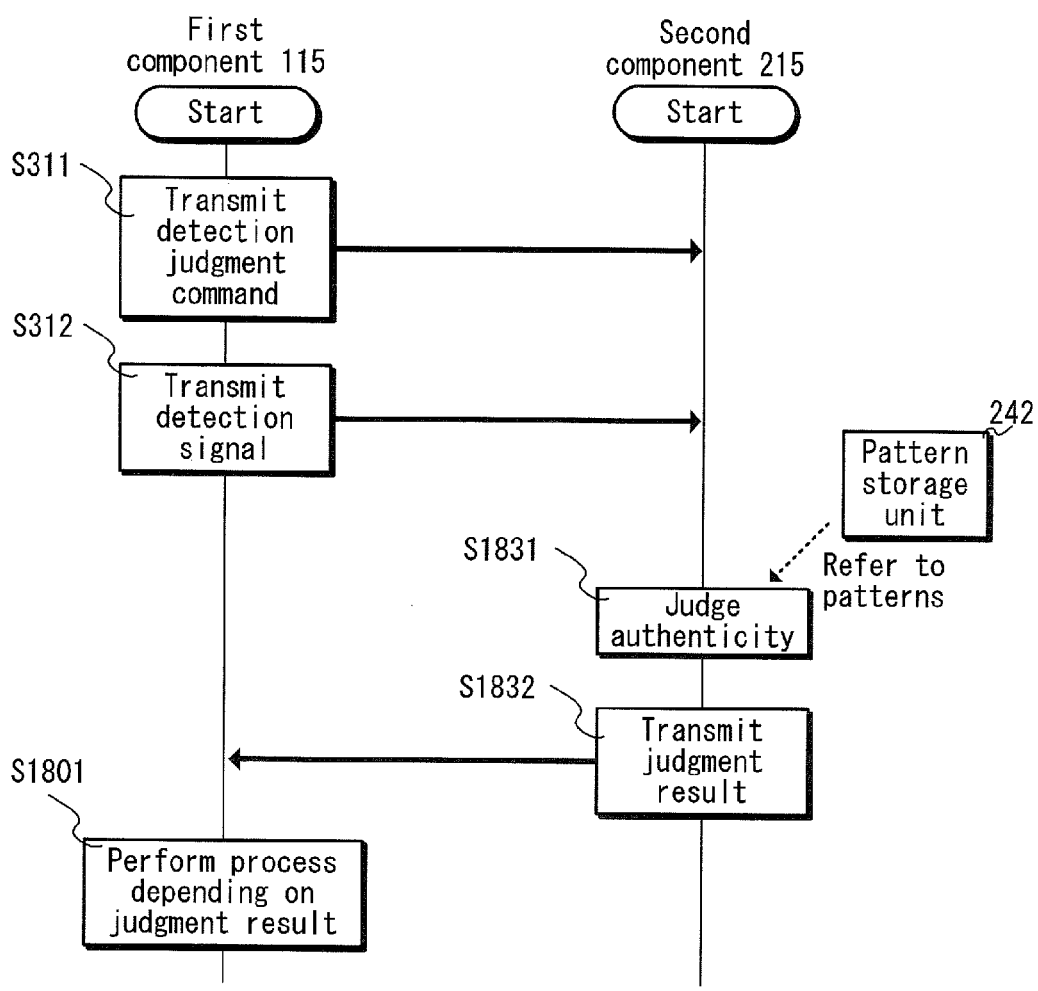
FIG. 20 illustrates a process flow of a transmission/reception of confidential data.

The following describes the flow of the process for transmitting or receiving confidential data between the first component 115 and the second component 215, with reference to FIG. 20.

Upon receiving a detection signal from the first component 115 (S312), the detection signal judging unit 226 of the second component 215 compares the received detection signal with a normal detection signal stored in the pattern storage unit 242, then when both signals are identical, the detection signal judging unit 226 judges that the received detection signal is authentic, and when the two signals are not identical, the detection signal judging unit 226 judges that the received detection signal is not authentic (S1831). The judgment result transmitting unit 220 transmits the judgment result to the first component 115 (S1832).

A tamper-resistance control unit 127 of the first component 115 performs a process depending on the judgment result (S1801). This process is performed as illustrated in the lower portion of FIG. 4, and description thereof is omitted.

In Embodiment 2, the second component 210 judges the authenticity of the detection signal, which causes less signal deterioration than when the signal makes a round trip by loopback between antennas. This enables a stricter judgment to be made on the detection signal, and the tamper-resistance is expected to be improved.

Note that, in FIG. 19, the fourth component 415 of the fourth circuit board 405 includes a detection signal judging unit 426, a pattern storage unit 442, a judgment result transmitting unit 420, a core interface unit 439, and a core 440. As in the second component 215, in the fourth component 415, the detection signal judging unit 426 judges the authenticity of the detection signal, and the judgment result transmitting unit 420 transmits the judgment result.

<Other Examples of Method for Judging Authenticity>

FIGS. 19 and 20 illustrate an example of judging the authenticity of the detection signal by referring to the patterns stored in advance. However, the present invention is not limited to this structure.

Figure 21:
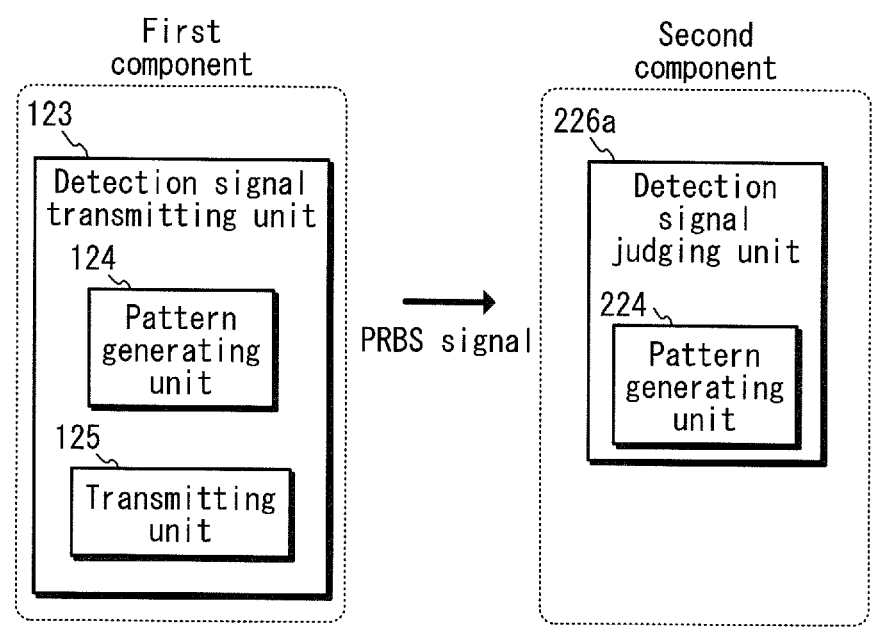
FIG. 21 illustrates a modification of the detection signal.

For example, as illustrated in FIG. 21, the pattern generating unit 124 of the first component and a pattern generating unit 224 of the second component both may generate bit sequences using the PRBS (Pseudo-Random Bit Sequence). The pattern generating units 124 and 224 use the same algorithm and initial seed values of the PRBS.

Upon receiving a detection signal (PRBS signal) from the first component, a detection signal judging unit 226a judges the authenticity of the received detection signal by comparing bit sequences indicated by the received detection signal with bit sequences generated by the pattern generating unit 224.

<Other Examples of Structure>

Figure 22:
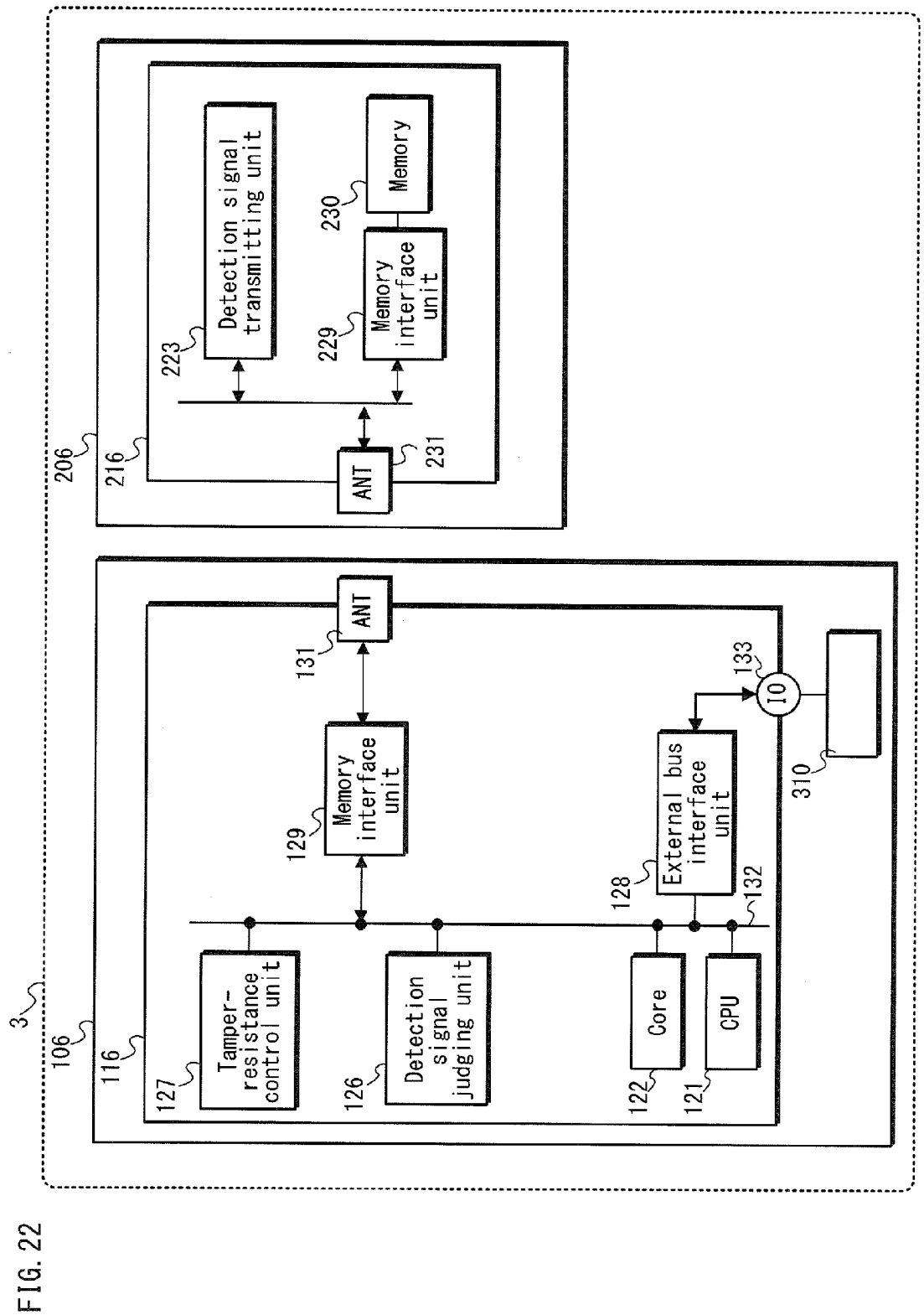
FIG. 22 is a functional block diagram of a communication device 3.

Note that the structure illustrated in FIG. 19 may be replaced with another structure in which a detection signal transmitting unit is mounted in the second component, and a detection signal judging unit and a judgment result transmitting unit are mounted in the first component. More specifically, the structure of a communication device 3 illustrated in FIG. 22 may be adopted.

Figure 23:
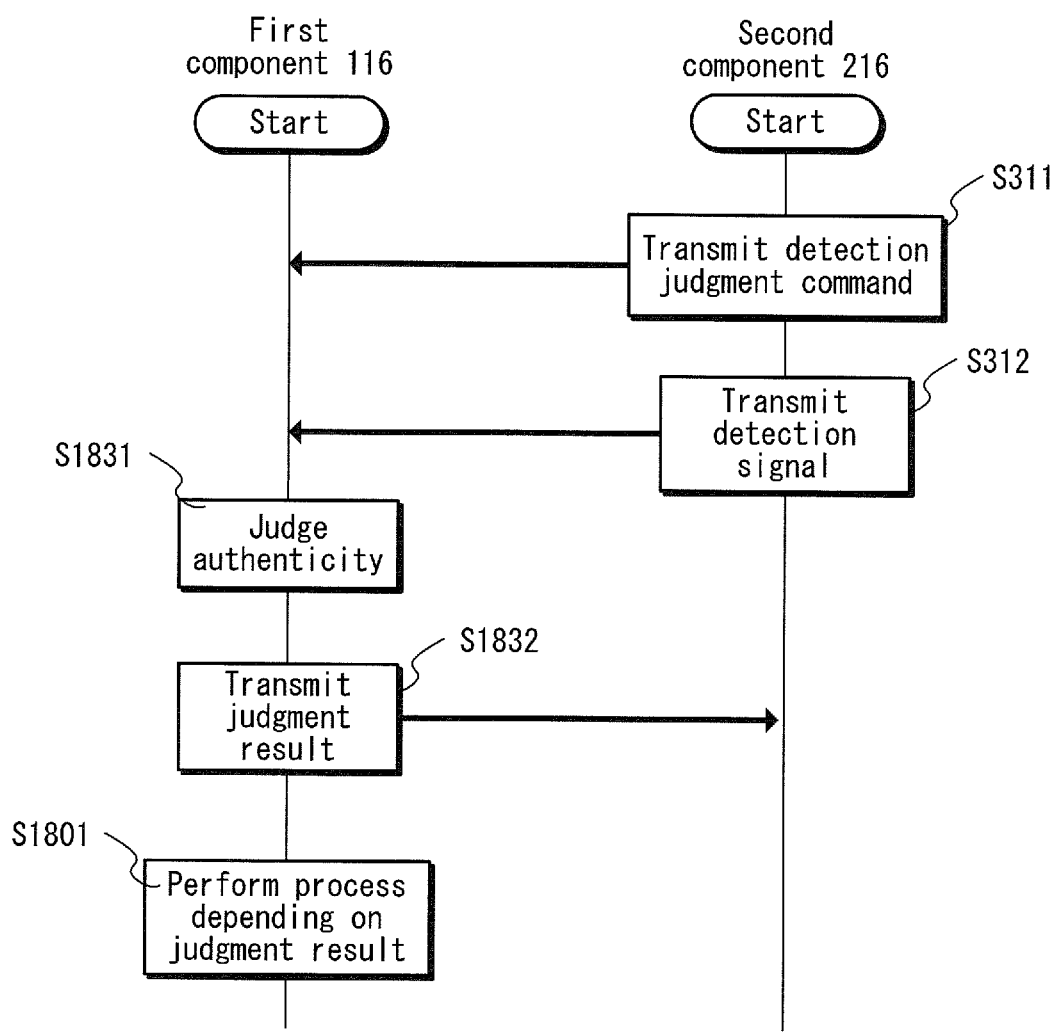
FIG. 23 illustrates a process flow of a transmission/reception of confidential data.

The communication device 3 includes a first circuit board 106 and a second circuit board 206, wherein the first circuit board 106 includes a first component 116, and the second circuit board 206 includes a second component 216 (which includes a detection signal transmitting unit 223). FIG. 23 illustrates the operation flow of the communication device 3 illustrated in FIG. 22. The processes illustrated in FIG. 23 are the same as those illustrated in FIG. 20 except for the components that perform the processes. Thus the same step numbers are assigned and description of the processes is omitted.

Embodiment 3

In Embodiment 3, a wired communication, not a wireless communication, is performed between circuit components.

Figure 24:
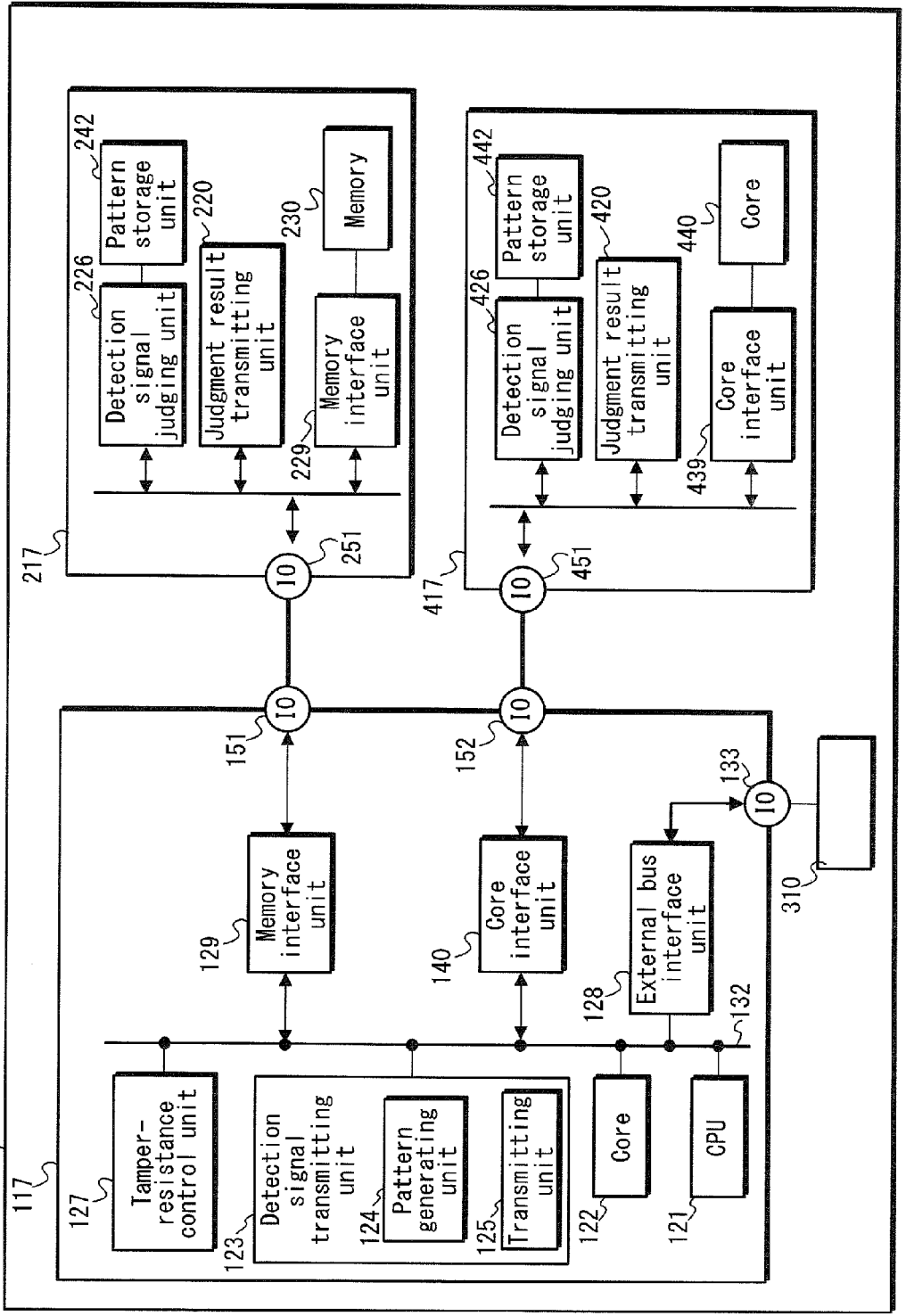
FIG. 24 is a functional block diagram of a communication device 4.

In a communication device 4 illustrated in FIG. 24, a first component 117, a second component 217, a third component 317, and a fourth component 417 are mounted on a circuit board 107.

The first component 117 and the second component 217 communicate with each other via conductive wires (high-speed interfaces) connected to external terminals 151 and 251, respectively. Also, the first component 117 and the fourth component 417 communicate with each other via conductive wires connected to external terminals 152 and 451, respectively.

In the case of this structure, the conductive wire may be probed in an unauthorized manner. Thus the technology described in Embodiment 2 (or Embodiment 1) may be applied to detect the transmission characteristics of the signal that flows through the conductive wires, over the bands ranging from the highest frequency band to the lowest frequency band, at a low cost. Accordingly, the tamper-resistance is expected to be improved.

Embodiment 4

Embodiments 1-3 describe, as one example, a case where a communication is performed in a device to transmit confidential data. However, not limited to this structure, the present invention may be applied to, for example, a communication performed between devices or a connector between circuit boards. The following describes such examples with reference to FIGS. 26 to 29.

Figure 26:
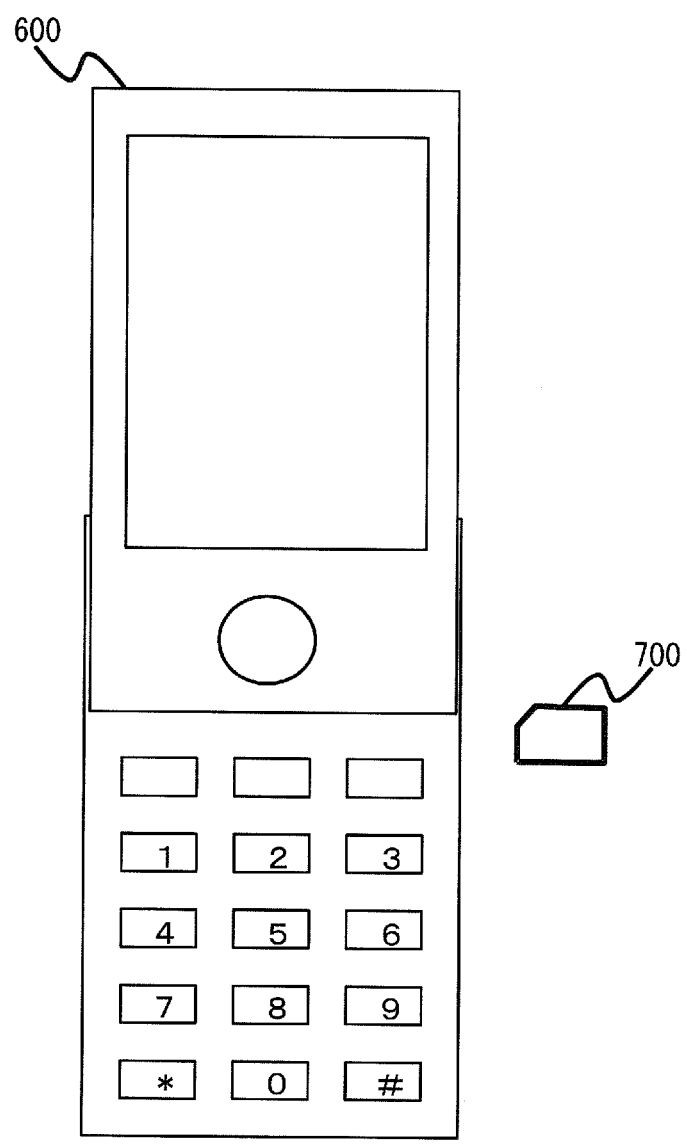

As illustrated in FIG. 26, the methods described in Embodiments 1 to 3 can be applied to a case where confidential data is transmitted via a wireless communication performed between a memory card slot of a mobile phone 600 (which includes the function of the first component) and a memory card 700 (which includes the function of the second component).

FIG. 27 is a functional block diagram of the mobile phone 600 and the memory card 700. In FIG. 27, the blocks that are similar to those of FIG. 2 are assigned the same reference signs as in FIG. 2.

Figure 28A:
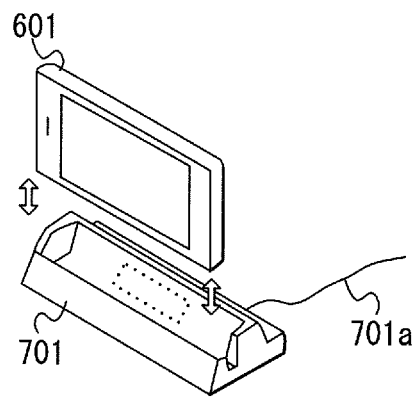
FIG. 28A illustrates an example of a wireless communication performed between a mobile phone 601 and a cradle 701.

Also, FIG. 28A illustrates an example of a wireless communication performed between a mobile phone 601 (having the function of the first component) and a cradle 701 (having the function of the second component).

The mobile phone 601 includes an antenna 131 for wireless communication in a back face of a housing, and the cradle 701 includes an antenna 231 at a position (in FIG. 28A, a region encircled by a dotted line) that faces the antenna 131 when the mobile phone 601 is attached to the cradle 701. With this structure, confidential data can be transmitted via a wireless communication performed between the mobile phone 601 and one of various types of devices connected to a communication cable 701a of the cradle 701. Also, when the cradle 701 has a charging function, the user can perform both data communication and charging, which improves the convenience of the user.

Figure 28B:
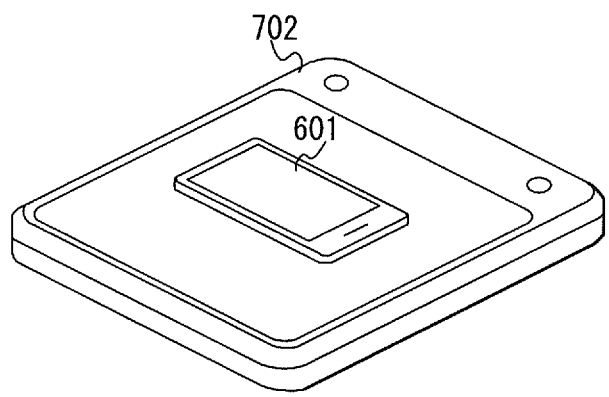
FIG. 28B illustrates an example of a wireless communication performed between the mobile phone 601 and a contactless charging pad 702.

FIG. 28B illustrates an example of a wireless communication performed between the mobile phone 601 (having the function of the first component) and a contactless charging pad 702 (having the function of the second component).

The mobile phone 601 and the contactless charging pad 702 comply with the Qi™ standard. The contactless charging pad 702 charges the mobile phone 601 placed on the surface of the contactless charging pad 702.

Also, the antenna 231 is provided at a position that faces the antenna 131 provided in the surface of the contactless charging pad 702 such that confidential data can be transmitted between the mobile phone 601 and the contactless charging pad 702 over a wireless communication.

Figure 29:
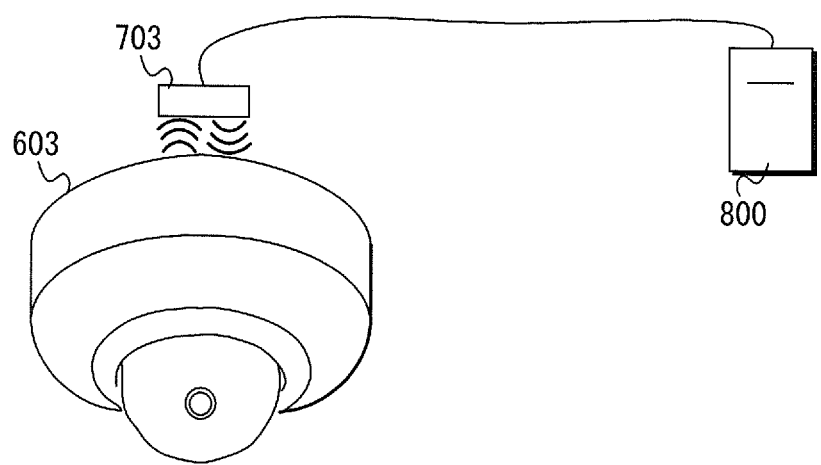
FIG. 29 illustrates an example of a wireless communication performed between a monitor camera 603 and a communication unit 703.
Figure 30:
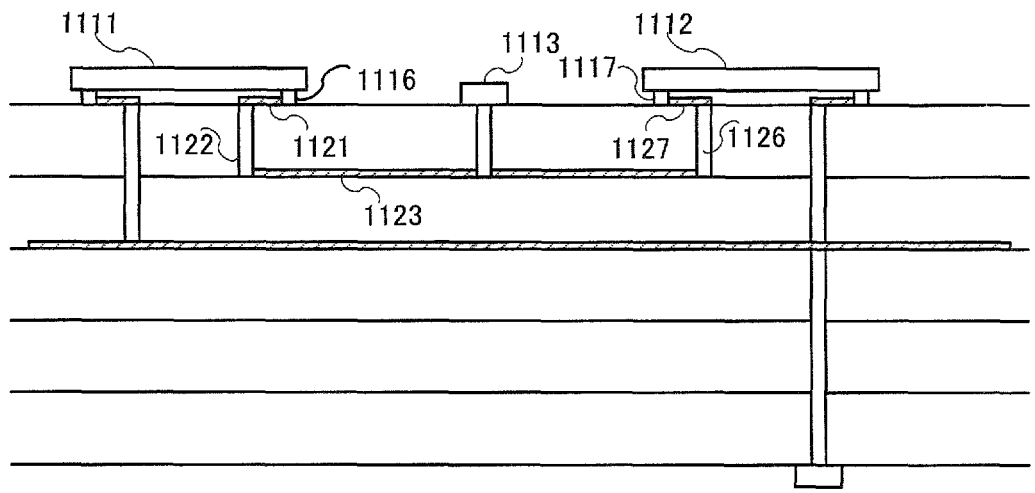
FIG. 30 is a cross-sectional view of a circuit board of a conventional technology disclosed in Patent Literature 1.
Figure 31A:
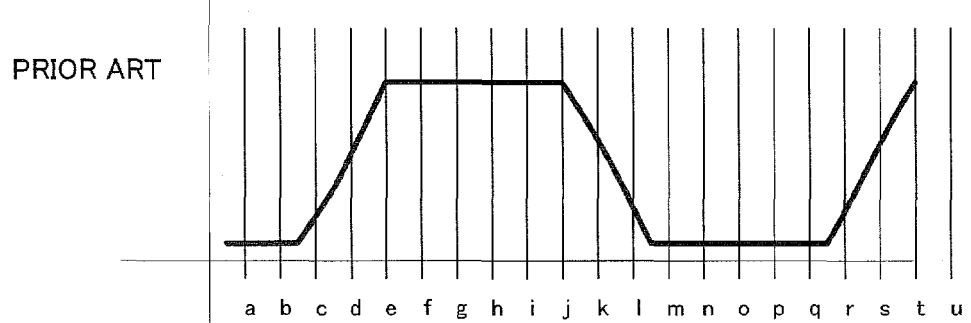
FIGS. 31A through 31C illustrate operation waveforms observed in the circuit board of the conventional technology disclosed in Patent Literature 1.
Figure 31B:
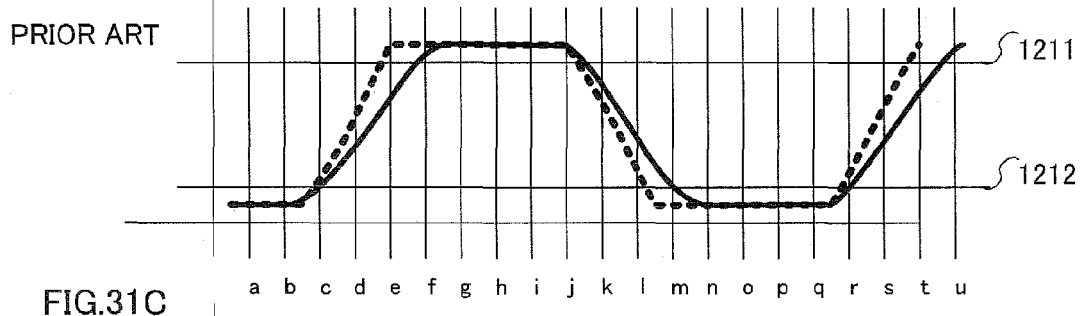
Figure 31C:
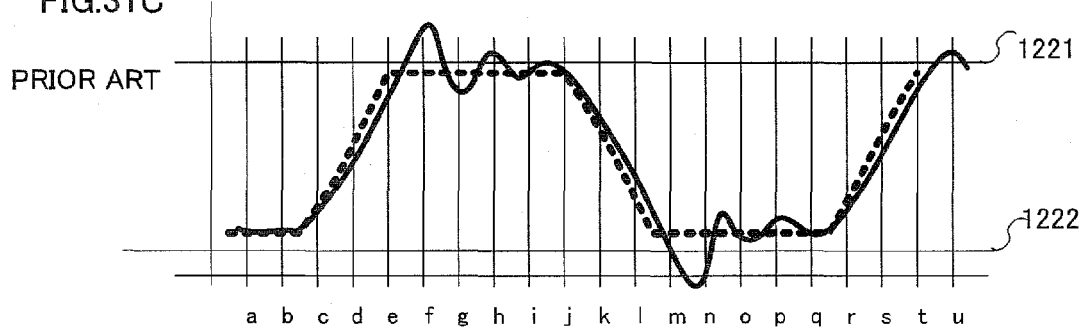

FIG. 29 illustrates an example of a wireless communication performed between a monitor camera 603 (having the function of the first component) and a communication unit 703 (having the function of the second component).

The monitor camera 603 includes the antenna 131 for wireless communication at the bottom of a housing thereof, and performs a wireless communication with the communication unit 703. A video server 800 receives video data of a video image captured by the monitor camera 603 via the communication unit 703, and stores the received video data.

Confidentiality is required for data of video image captured by the monitor camera 603. In terms of this, the structure of the present embodiment allows transmission of data over a wireless communication while ensuring the confidentiality of the data.

Also, when the monitor camera 603 is installed on the ceiling, cabling may be a difficult work. However, when a wireless communication is performed in a part of a communication path, the wiring work becomes easier.

Furthermore, if the monitor camera 603 is a movable camera, it is possible to prevent the cable from tangling by adopting a wireless communication in a part of the communication path. This makes it possible to extend the range of setting and movement of the camera.

In the devices described as examples with reference to FIGS. 26 to 29, one of two devices has the function of the first component and the other has the function of the second device. However, the present invention is not limited to this structure, but, for example, the functions of the two devices may be exchanged for each other. Also, one or both of the two devices may have the functions of both the first and second components.

Furthermore, in the devices described above as examples with reference to FIGS. 26 to 29, each device has the function of the first component or the second component described in Embodiment 1. However, not limited to this structure, each of the devices may have the function of the first component or the second component described in Embodiment 2 or 3.

(Supplementary Note 1)

Up to now, Embodiments 1 to 4 of the present invention have been described. However, the present invention is not limited to these embodiments, but may be implemented in various types of forms for achieving the aims of the embodiments and aims related to or connected with the aims of the embodiments. The following are examples of such.

(1) Data patterns generated by the pattern generating unit 124 are not limited to those contained in the table 124a (FIG. 3). For example, the pattern generating unit 124 may generate bit sequences based on the Pseudo-Random Bit Sequence (PRBS), and the transmitting unit 125 may transmit a detection signal that is generated by modulating the bit sequences generated by the pattern generating unit 124.

(2) In Embodiment 1, the detection signal transmitting unit 123 transmits bit sequences such as 0101 as a detection signal. However, not limited to this structure, a sinusoidal wave may be transmitted. Use of sinusoidal wave makes it possible to detect a change in transmission characteristics more easily.

For example, a single sinusoidal wave that is not a synthetic wave may be used as a detection signal, and the sinusoidal wave may be transmitted repeatedly by varying the transmission frequency among $f_0$, $f_0/2$, and $f_0/3$ (see the lowest part of FIG. 3). With this structure, it is possible to limit the frequency spectrum of each detection signal to a single frequency spectrum. This makes it possible to detect the transmission characteristics of antennas more strictly, and the tamper-resistance is expected to be improved.

(3) Standard values used for judging the authenticity of the detection signal (such as the value of reference voltage or a level of match between patterns that can be judged as identical) can be set as appropriate based on various conditions such as the importance of the confidential data to be transmitted or received, and the length of time allowed for the process for checking the authenticity.

Figure 25:
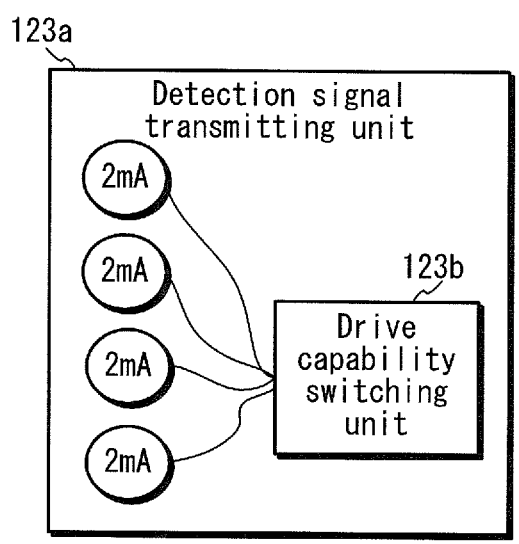
FIG. 25 illustrates a modification of the detection signal transmitting unit.

(4) In addition to use of various frequency spectrums of the detection signal, various levels of drive capability regarding the detection signal to be transmitted may be used. FIG. 25 illustrates a detection signal transmitting unit 123a that is realized by, for example, a CMOS (Complementary Metal Oxide Semiconductor) circuit, and includes a drive capability switching unit 123b that switches among four levels of drive capability: 2 mA, 4 mA, 6 mA, and 8 mA. When the drive capability is low, the rise of the waveform is gradual. Accordingly, by incorporating the adjustment of the drive capability, more various detection signals can be used. This contributes to the judgment on the transmission characteristics on the transmission path.

(5) In FIGS. 2, 19, 22 and 24, as some examples, communications between components in a communication device including a first circuit board and a second circuit board are illustrated. However, the present invention is not limited to these structures. For example, the technologies of the above embodiments may be applied to the communication performed between devices in a communication system which includes a first device having a first circuit board and a second device having a second circuit board.

(6) In step S313 illustrated in FIG. 4 of Embodiment 1, the detection signal judging unit 126 judges the authenticity after demodulating the received modulated signal. However, the present invention is not limited to this structure.

For example, an analog waveform of a signal transmitted by the detection signal transmitting unit 123 may be stored in the buffer 130, and the detection signal judging unit 126 may judge the identity between the analog waveform of the received return signal and the stored analog waveform by comparison.

(7) In the above embodiments, a probe and a loop antenna are used as instruments for observing waveforms on the transmission path, as one example. However, such instruments are not limited to these, but any other instruments may be used for this purpose.

(Supplementary Note 2)

(1) The present embodiment provides a communication device comprising: a first circuit board in which a first component for communication is implemented; and a second circuit board in which a second component for communication is implemented, wherein a communication is performed between the first component and the second component, the first component includes a transmitting unit, a judging unit, and a control unit, the second component includes a returning unit, the transmitting unit of the first component transmits a plurality of detection signals having different frequency spectrums to the second component, upon receiving the detection signals, the returning unit of the second component returns, as return signals, respective signal waveforms of the received detection signals to the first component, the judging unit of the first component judges authenticity of the received return signals by referring to the transmitted detection signals, and when the judging unit judges that the received return signals are not authentic, the control unit adds a restriction to the communication performed between the first component and the second component.

(2) In the above-described communication device, the plurality of detection signals may include: a detection signal obtained by modulating a carrier signal by bits constituting a first bit sequence; and a detection signal obtained by modulating the carrier signal by bits constituting a bit sequence that is composed of sequences of 0s and 1s that are each m times as many as each 0 and each 1 constituting the first bit sequence, wherein m is a natural number greater than 1.

(3) In the above communication device of (2), the plurality of detection signals may further include: a detection signal obtained by modulating the carrier signal by bits constituting a second bit sequence that is composed of sequences of 0s and 1s differently arranged from sequences of 0s and 1s of the first bit sequence; and a detection signal obtained by modulating the carrier signal by bits constituting a bit sequence that is composed of sequences of 0s and 1s that are each n times as many as each 0 and each 1 constituting the second bit sequence, wherein n is a natural number greater than 1.

Note that m and n are each a natural number greater than 1, and the uppermost value thereof is, for example, 30.

(4) The above communication device of (1) may further comprise a threshold changing unit configured to change a threshold of a potential received by the judging unit.

(5) In the above communication device of (1), each of the first component and the second component may include an antenna, and a close-coupled wireless communication is performed between the first component and the second component in a state where a portion of the first component to which the antenna is attached faces a portion of the second component to which the antenna is attached.

(6) In the above communication device of (1), the plurality of detection signals may be sinusoidal waves having different frequencies.

(7) In the above communication device of (1), the plurality of detection signals may each be a detection signal obtained by modulating the carrier signal by bits constituting a bit sequence that is generated from a pseudo-random bit sequence.

(8) The present embodiment provides a communication device comprising: a first circuit board in which a first component for communication is implemented; and a second circuit board in which a second component for communication is implemented, wherein a communication is performed between the first component and the second component, the first component includes a first transmitting unit and a control unit, the second component includes a storage unit, a judging unit, and a second transmitting unit, the first transmitting unit transmits a plurality of detection signals having different frequency spectrums to the second component, the storage unit of the second component stores information of detection signals that are to be received, upon receiving the detection signals from the first component, the judging unit of the second component judges authenticity of the received detection signals by referring to the information stored in the storage unit, the second transmitting unit transmits a judgment result of the judging unit to the first component, and when the judgment result received from the second component indicates that the detection signals are not authentic, the control unit of the first component adds a restriction to the communication performed between the first component and the second component.

(9) The present embodiment provides a communication device comprising: a first circuit board in which a first component for communication is implemented; and a second circuit board in which a second component for communication is implemented, wherein a communication is performed between the first component and the second component, the second component includes a transmitting unit, the first component includes a judging unit and a control unit, the transmitting unit of the second component transmits a plurality of detection signals having different frequency spectrums to the first component, upon receiving the detection signals, the judging unit of the first component judges authenticity of the received detection signals, and when the judging unit judges that the received detection signals are not authentic, the control unit adds a restriction to the communication performed between the first component and the second component.

(10) The present embodiment provides a communication system comprising: a first device having a first circuit board in which a first component for communication is implemented; and a second device having a second circuit board in which a second component for communication is implemented, wherein a communication is performed between the first device and the second device, the first component includes a transmitting unit, a judging unit, and a control unit, the second component includes a returning unit, the transmitting unit of the first component transmits a plurality of detection signals having different frequency spectrums to the second component, upon receiving the detection signals, the returning unit of the second component returns, as return signals, respective signal waveforms of the received detection signals to the first component, the judging unit of the first component judges authenticity of the received return signals by referring to the transmitted detection signals, and when the judging unit judges that the received return signals are not authentic, the control unit adds a restriction to the communication performed between the first component and the second component.

(11) The present embodiment provides a communication device comprising: a first circuit board in which a first component for communication is implemented; and a second circuit board in which a second component for communication is implemented, wherein a communication is performed between the first component and the second component, the first component includes a transmitting unit, a judging unit, and a control unit, the second component includes a returning unit, the transmitting unit of the first component transmits, to the second component, a plurality of detection signals that are each a detection signal obtained by modulating a carrier signal by bits constituting a bit sequence that is generated from a pseudo-random bit sequence, upon receiving the detection signals, the returning unit of the second component returns, as return signals, respective signal waveforms of the received detection signals to the first component, the judging unit of the first component judges authenticity of the received return signals by referring to the transmitted detection signals, and when the judging unit judges that the received return signals are not authentic, the control unit adds a restriction to the communication performed between the first component and the second component.

(12) The present embodiment provides a communication device for performing a communication with another device, comprising: a transmitting unit configured to transmit a plurality of detection signals having different frequency spectrums to the other device; a judging unit configured to, upon receiving signal waveforms of the transmitted detection signals from the other device as return signals, judge authenticity of the received return signals; and a control unit configured to add a restriction to the communication performed with the other device when the judging unit judges that the received return signals are not authentic.

(13) In the above communication device of (12), the plurality of detection signals may include: a detection signal obtained by modulating a carrier signal by bits constituting a first bit sequence; and a detection signal obtained by modulating the carrier signal by bits constituting a bit sequence that is composed of sequences of 0s and 1s that are each m times as many as each 0 and each 1 constituting the first bit sequence, wherein m is a natural number greater than 1.

(14) In the above communication device of (13), the plurality of detection signals may further include: a detection signal obtained by modulating the carrier signal by bits constituting a second bit sequence that is composed of sequences of 0s and 1s differently arranged from sequences of 0s and 1s of the first bit sequence; and a detection signal obtained by modulating the carrier signal by bits constituting a bit sequence that is composed of sequences of 0s and 1s that are each n times as many as each 0 and each 1 constituting the second bit sequence, wherein n is a natural number greater than 1.

(15) The above communication device of (12) may further comprise a threshold changing unit configured to change a threshold of a potential received by the judging unit.

(16) The present embodiment provides a communication device for performing a communication with another device, comprising: a returning unit configured to, upon receiving a plurality of detection signals having different frequency spectrums, return, as return signals, respective signal waveforms of the received detection signals.

(17) In the above communication device of (16), the other device may include: a transmitting unit configured to transmit the plurality of detection signals having different frequency spectrums to the communication device; a judging unit configured to, upon receiving the signal waveforms of the transmitted detection signals from the communication device as the return signals, judge authenticity of the received return signals; and a control unit configured to add a restriction to the communication performed with the communication device when the judging unit judges that the received return signals are not authentic.

INDUSTRIAL APPLICABILITY

The communication device of the present invention is effective in that it is possible to transmit a confidential signal while maintaining the tamper-resistance.

REFERENCE SIGNS LIST 1, 2, 3, 4 communication device
100, 105 first circuit board
110, 115, 116 first component
121 CPU
122 core
123 detection signal transmitting unit
124 pattern generating unit
125 transmitting unit
126 detection signal judging unit
127 tamper-resistance control unit
128 external bus interface unit
129 memory interface unit
130 buffer
131, 131a, 131b, 131c antenna
132 internal bus
133 external terminal
140 core interface unit
141 antenna
200, 205 second circuit board
210, 215 second component
220 judgment result transmitting unit
223 detection signal transmitting unit
224 pattern generating unit
226, 226a detection signal judging unit
229 memory interface unit
230 memory
231 antenna
232 internal bus
233 detection signal returning unit
242 pattern storage unit
310 third component
405 fourth circuit board
415 fourth component
431 antenna
500, 501 probe
502-505 loop antenna
600, 601 mobile phone (example of communication device)
603 monitor camera (example of communication device)
700 memory card (example of communication device)
701 cradle (example of communication device)
702 contactless charging pad (example of communication device)
703 communication unit (example of communication device)

The invention claimed is:

1. A communication device comprising:
a first circuit board in which a first component for communication is implemented; and
a second circuit board in which a second component for communication is implemented,
wherein a communication is performed between the first component and the second component,
the first component includes a transmitting unit, a judging unit, and a control unit,
the second component includes a returning unit,
the transmitting unit of the first component transmits a plurality of detection signals having different frequency spectrums to the second component,
upon receiving the detection signals, the returning unit of the second component returns, as return signals, respective signal waveforms of the received detection signals to the first component,
the judging unit of the first component judges authenticity of the received return signals by referring to the transmitted detection signals, and
when the judging unit judges that the received return signals are not authentic, the control unit adds a restriction to the communication performed between the first component and the second component.

2. The communication device of claim 1, wherein
the plurality of detection signals include:
a detection signal obtained by modulating a carrier signal by bits constituting a first bit sequence; and a detection signal obtained by modulating the carrier signal by bits constituting a bit sequence that is composed of sequences of 0s and 1s that are each m times as many as each 0 and each 1 constituting the first bit sequence, wherein m is a natural number greater than 1.

3. The communication device of claim 2, wherein the plurality of detection signals further include:

a detection signal obtained by modulating the carrier signal by bits constituting a second bit sequence that is composed of sequences of 0s and 1s differently arranged from sequences of 0s and 1s of the first bit sequence; and a detection signal obtained by modulating the carrier signal by bits constituting a bit sequence that is composed of sequences of 0s and 1s that are each n times as many as each 0 and each 1 constituting the second bit sequence, wherein n is a natural number greater than 1.

4. The communication device of claim 1 further comprising
a threshold changing unit configured to change a threshold of a potential received by the judging unit.

5. The communication device of claim 1, wherein
each of the first component and the second component includes an antenna, and
a close-coupled wireless communication is performed between the first component and the second component in a state where a portion of the first component to which the antenna is attached faces a portion of the second component to which the antenna is attached.

6. The communication device of claim 1, wherein
the plurality of detection signals are sinusoidal waves having different frequencies.

7. The communication device of claim 1, wherein
the plurality of detection signals are each a detection signal obtained by modulating the carrier signal by bits constituting a bit sequence that is generated from a pseudo-random bit sequence.

8. A communication device comprising:
a first circuit board in which a first component for communication is implemented; and
a second circuit board in which a second component for communication is implemented,
wherein a communication is performed between the first component and the second component,
the first component includes a first transmitting unit and a control unit,
the second component includes a storage unit, a judging unit, and a second transmitting unit,
the first transmitting unit transmits a plurality of detection signals having different frequency spectrums to the second component,
the storage unit of the second component stores information of detection signals that are to be received,
upon receiving the detection signals from the first component, the judging unit of the second component judges authenticity of the received detection signals by referring to the information stored in the storage unit,
the second transmitting unit transmits a judgment result of the judging unit to the first component, and
when the judgment result received from the second component indicates that the detection signals are not authentic, the control unit of the first component adds a restriction to the communication performed between the first component and the second component.

9. A communication device comprising:
a first circuit board in which a first component for communication is implemented; and
a second circuit board in which a second component for communication is implemented,
wherein a communication is performed between the first component and the second component,
the second component includes a transmitting unit,
the first component includes a judging unit and a control unit,
the transmitting unit of the second component transmits a plurality of detection signals having different frequency spectrums to the first component,
upon receiving the detection signals, the judging unit of the first component judges
authenticity of the received detection signals, and
when the judging unit judges that the received detection signals are not authentic, the control unit adds a restriction to the communication performed between the first component and the second component.

10. A communication system comprising:
a first device having a first circuit board in which a first component for communication is implemented; and
a second device having a second circuit board in which a second component for communication is implemented,
wherein a communication is performed between the first device and the second device,
the first component includes a transmitting unit, a judging unit, and a control unit,
the second component includes a returning unit,
the transmitting unit of the first component transmits a plurality of detection signals having different frequency spectrums to the second component,
upon receiving the detection signals, the returning unit of the second component returns, as return signals, respective signal waveforms of the received detection signals to the first component,
the judging unit of the first component judges authenticity of the received return signals by referring to the transmitted detection signals, and
when the judging unit judges that the received return signals are not authentic, the control unit adds a restriction to the communication performed between the first component and the second component.

11. A communication device comprising:
a first circuit board in which a first component for communication is implemented; and
a second circuit board in which a second component for communication is implemented,
wherein a communication is performed between the first component and the second component,
the first component includes a transmitting unit, a judging unit, and a control unit,
the second component includes a returning unit,
the transmitting unit of the first component transmits, to the second component, a plurality of detection signals that are each a detection signal obtained by modulating a carrier signal by bits constituting a bit sequence that is generated from a pseudo-random bit sequence,
upon receiving the detection signals, the returning unit of the second component returns, as return signals, respective signal waveforms of the received detection signals to the first component,
the judging unit of the first component judges authenticity of the received return signals by referring to the transmitted detection signals, and
when the judging unit judges that the received return signals are not authentic, the control unit adds a restriction to the communication performed between the first component and the second component.

12. A communication device for performing a communication with another device, comprising:
- a transmitting unit configured to transmit a plurality of detection signals having different frequency spectrums to the other device;
- a judging unit configured to, upon receiving signal waveforms of the transmitted detection signals from the other device as return signals, judge authenticity of the received return signals; and
- a control unit configured to add a restriction to the communication performed with the other device when the judging unit judges that the received return signals are not authentic; wherein the plurality of detection signals include:
- a detection signal obtained by modulating a carrier signal by bits constituting a first bit sequence; and
- a detection signal obtained by modulating the carrier signal by bits constituting a bit sequence that is composed of sequences of 0s and 1s that are each m times as many as each 0 and each 1 constituting the first bit sequence, wherein m is a natural number greater than 1.

13. The communication device of claim 12, wherein the plurality of detection signals further include:
- a detection signal obtained by modulating the carrier signal by bits constituting a second bit sequence that is composed of sequences of 0s and 1s differently arranged from sequences of 0s and 1s of the first bit sequence; and
- a detection signal obtained by modulating the carrier signal by bits constituting a bit sequence that is composed of sequences of 0s and 1s that are each n times as many as each 0 and each 1 constituting the second bit sequence, wherein n is a natural number greater than 1.

14. The communication device of claim 12 further comprising
- a threshold changing unit configured to change a threshold of a potential received by the judging unit.

15. A communication device for performing a communication with another device, comprising:
- a returning unit configured to, upon receiving a plurality of detection signals having different frequency spectrums, return, as return signals, respective signal waveforms of the received detection signals;

wherein
the other device includes:
- a transmitting unit configured to transmit the plurality of detection signals having different frequency spectrums to the communication device;
- a judging unit configured to, upon receiving the signal waveforms of the transmitted detection signals from the communication device as the return signals, judge authenticity of the received return signals; and
- a control unit configured to add a restriction to the communication performed with the communication device when the judging unit judges that the received return signals are not authentic.

* * * * *